United States Patent
Bedekar

(10) Patent No.: US 10,673,546 B2
(45) Date of Patent: Jun. 2, 2020

(54) SCELL SELECTION AND OPTIMIZATION FOR TELECOMMUNICATION SYSTEMS

(71) Applicant: Nokia Solutions and Networks Oy, Espoo (FI)

(72) Inventor: Anand Bedekar, Glenview, IL (US)

(73) Assignee: Nokia Solutions and Networks Oy, Espoo (FI)

(*) Notice: Subject to any disclaimer, the term of this patent is extended or adjusted under 35 U.S.C. 154(b) by 57 days.

(21) Appl. No.: 16/143,776

(22) Filed: Sep. 27, 2018

(65) Prior Publication Data
US 2020/0106536 A1 Apr. 2, 2020

(51) Int. Cl.
| | | |
|---|---|---|
| H04B 17/309 | (2015.01) | |
| H04W 24/10 | (2009.01) | |
| H04W 48/20 | (2009.01) | |
| H04L 5/00 | (2006.01) | |
| G06N 20/00 | (2019.01) | |
| H04W 16/32 | (2009.01) | |

(52) U.S. Cl.
CPC .......... *H04B 17/309* (2015.01); *G06N 20/00* (2019.01); *H04L 5/0048* (2013.01); *H04L 5/0057* (2013.01); *H04W 24/10* (2013.01); *H04W 48/20* (2013.01); *H04W 16/32* (2013.01)

(58) Field of Classification Search
None
See application file for complete search history.

(56) References Cited

U.S. PATENT DOCUMENTS

| | | | | |
|---|---|---|---|---|
| 2016/0262065 | A1* | 9/2016 | Axmon | H04W 4/029 |
| 2017/0222746 | A1* | 8/2017 | Kang | H04B 7/0626 |
| 2019/0357057 | A1* | 11/2019 | Cirkic | H04W 24/10 |

OTHER PUBLICATIONS

Ian Scales "The Open RAN (ORAN) Alliance Formed to Lever Open 5G for "other" Technologies?" From https://www.telecomtv.com/content/mwc/the-open-ran-oran-alliance-formed-to-lever-open-5g-for-other-technologies-and-much-more-16429/, Dated Feb. 27, 2018, downloaded on Aug. 22, 2018.
Yannan Yuan "From C-RAN to O-RAN" China Mobile Research Institute. Jun. 21, 2018, Beijing, China.

* cited by examiner

*Primary Examiner* — Christine T Duong
(74) *Attorney, Agent, or Firm* — Harrington & Smith

(57) ABSTRACT

UE-related measurements taken on a Pcell in a wireless communication system are formed into a set of data. The Pcell overlaps with Scell(s). The UE-related measurements on the P cell are for a specific UE in the Pcell. Using a ML algorithm applied to the set of data, achievable channel quality is predicted for the specific UE for each of the Scell(s). The predicted achievable channel qualities are output for the specific UE to be used for Scell selection. At a RAN node, the set of data is sent toward an S cell prediction module for the module to determine information suitable to enable Scell selection for the specific UE. The RAN node receives information from the module allowing the RAN node to inform the selected UE of Scell(s) to be used for Scell selection for the specific UE. A node may train the ML algorithm using UE-related measurements on the Pcell.

20 Claims, 10 Drawing Sheets

SCELL SELECTION AND OPTIMIZATION FOR TELECOMMUNICATION SYSTEMS

TECHNICAL FIELD

This invention relates generally to wireless communications and, more specifically, relates to secondary cell selection in wireless communication systems.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below, at the beginning of the detailed description section.

Operators of cellular networks have been undertaking initiatives to enable greater use of open interfaces as well as analytics and machine learning and real-time analytics in the radio access network (RAN), especially for radio resource management (RRM) functions, in an effort to improve the performance and automation of the network. For example, in the xRAN forum and ORAN alliance, the network architecture employs a Radio Intelligent Controller (RIC) in order to aid in improving performance and automation.

The RIC may consist of a near-real-time portion (RIC near-RT) and a non-real-time portion (RIC-non-RT). Both of these might be used for machine learning systems, though the non-RT portion is assumed to operate over a longer period of time than does the near-RT portion, which is assumed to operate in close to real time.

However, in order to achieve these objectives of performance and automation for different functions of the RAN, new algorithms and interactions are needed. The RIC near-RT and RIC non-RT can be viewed as platforms on which such new functions and algorithms can be hosted.

One application of these is to help the cellular network perform cell selection for user equipment (UE). This is explained in more detail below.

BRIEF SUMMARY

This section is intended to include examples and is not intended to be limiting.

In an exemplary embodiment, a method includes forming user equipment-related measurements taken on a primary cell in a wireless communication system into a set of data, wherein the primary cell also overlaps with one or more secondary cells in the wireless communication system and wherein the user equipment-related measurements on the primary cell are for a specific user equipment in the primary cell. The method includes predicting, using a machine learning algorithm applied to the set of data, achievable channel quality for the specific user equipment for each of the one or more of the secondary cells. The method further includes outputting at least one of the predicted achievable channel qualities for the specific user equipment to be used for secondary cell selection for the specific user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: forming user equipment-related measurements taken on a primary cell in a wireless communication system into a set of data, wherein the primary cell also overlaps with one or more secondary cells in the wireless communication system and wherein the user equipment-related measurements on the primary cell are for a specific user equipment in the primary cell; predicting, using a machine learning algorithm applied to the set of data, achievable channel quality for the specific user equipment for each of the one or more of the secondary cells; and outputting at least one of the predicted achievable channel qualities for the specific user equipment to be used for secondary cell selection for the specific user equipment.

An exemplary computer program product includes a computer-readable storage medium bearing computer program code embodied therein for use with a computer. The computer program code includes: code for forming user equipment-related measurements taken on a primary cell in a wireless communication system into a set of data, wherein the primary cell also overlaps with one or more secondary cells in the wireless communication system and wherein the user equipment-related measurements on the primary cell are for a specific user equipment in the primary cell; code for predicting, using a machine learning algorithm applied to the set of data, achievable channel quality for the specific user equipment for each of the one or more of the secondary cells; and code for outputting at least one of the predicted achievable channel qualities for the specific user equipment to be used for secondary cell selection for the specific user equipment.

In another exemplary embodiment, an apparatus comprises: means for forming user equipment-related measurements taken on a primary cell in a wireless communication system into a set of data, wherein the primary cell also overlaps with one or more secondary cells in the wireless communication system and wherein the user equipment-related measurements on the primary cell are for a specific user equipment in the primary cell; means for predicting, using a machine learning algorithm applied to the set of data, achievable channel quality for the specific user equipment for each of the one or more of the secondary cells; and means for outputting at least one of the predicted achievable channel qualities for the specific user equipment to be used for secondary cell selection for the specific user equipment.

In an additional exemplary embodiment, a method is disclosed comprising forming, at a radio access network node, user equipment-related measurements taken on a primary cell in a wireless communication system into a set of data. The primary cell also overlaps with one or more secondary cells in the wireless communication system and the user equipment-related measurements are for a specific user equipment in the primary cell. The primary cell is formed by the radio access network node. The method includes sending the set of data toward a secondary cell prediction module for the secondary cell module to determine information suitable to enable secondary cell selection for the specific user equipment. The method further includes receiving the information from the secondary cell prediction module, the information further allowing the radio access network node to inform the selected user equipment of selected at least one of the one or more secondary cells to be used for secondary cell selection for the specific user equipment. The method includes sending by the radio access network node indication of the at least one selected secondary cell toward the specific user equipment.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: forming, at a radio access network node, user equipment-related measurements taken on a primary cell in a wireless communication system into a set of data, wherein the primary cell also overlaps with one or more secondary cells in the wireless communication system, wherein the user equipment-related measurements are for a specific user equipment in the primary cell, and wherein the primary cell is formed by the radio access network node; sending the set of data toward a secondary cell prediction module for the secondary cell module to determine information suitable to enable secondary cell selection for the specific user equipment; receiving the information from the secondary cell prediction module, the information further allowing the radio access network node to inform the selected user equipment of selected at least one of the one or more secondary cells to be used for secondary cell selection for the specific user equipment; and sending by the radio access network node indication of the at least one selected secondary cell toward the specific user equipment.

An exemplary computer program product includes a computer-readable storage medium bearing computer program code embodied therein for use with a computer. The computer program code includes: code for forming, at a radio access network node, user equipment-related measurements taken on a primary cell in a wireless communication system into a set of data, wherein the primary cell also overlaps with one or more secondary cells in the wireless communication system, wherein the user equipment-related measurements are for a specific user equipment in the primary cell, and wherein the primary cell is formed by the radio access network node; code for sending the set of data toward a secondary cell prediction module for the secondary cell module to determine information suitable to enable secondary cell selection for the specific user equipment; code for receiving the information from the secondary cell prediction module, the information further allowing the radio access network node to inform the selected user equipment of selected at least one of the one or more secondary cells to be used for secondary cell selection for the specific user equipment; and code for sending by the radio access network node indication of the at least one selected secondary cell toward the specific user equipment.

In another exemplary embodiment, an apparatus comprises: means for forming, at a radio access network node, user equipment-related measurements taken on a primary cell in a wireless communication system into a set of data, wherein the primary cell also overlaps with one or more secondary cells in the wireless communication system, wherein the user equipment-related measurements are for a specific user equipment in the primary cell, and wherein the primary cell is formed by the radio access network node; means for sending the set of data toward a secondary cell prediction module for the secondary cell module to determine information suitable to enable secondary cell selection for the specific user equipment; means for receiving the information from the secondary cell prediction module, the information further allowing the radio access network node to inform the selected user equipment of selected at least one of the one or more secondary cells to be used for secondary cell selection for the specific user equipment; and means for sending by the radio access network node indication of the at least one selected secondary cell toward the specific user equipment.

A further exemplary embodiment is a method, comprising receiving multiple sets of data. The multiple sets of data comprise user equipment-related measurements taken on a primary cell in a wireless communication system and corresponding measurements of channel quality for one or more secondary cells. The primary cell overlaps with the one or more secondary cells in the wireless communication system and wherein the user equipment-related measurements of the primary cell are for user equipment in the primary cell. The method includes performing training of a machine learning algorithm at least by applying the multiple sets of data to the machine learning algorithm, wherein the machine learning algorithm is configured to output a prediction of achievable channel quality for each of the one or more secondary cells. The method further includes outputting, in response to training being completed on the machine-learning algorithm, information defining the trained machine-learning algorithm.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving multiple sets of data, the multiple sets of data comprising user equipment-related measurements taken on a primary cell in a wireless communication system and corresponding measurements of channel quality for one or more secondary cells, wherein the primary cell overlaps with the one or more secondary cells in the wireless communication system and wherein the user equipment-related measurements of the primary cell are for user equipment in the primary cell; performing training of a machine learning algorithm at least by applying the multiple sets of data to the machine learning algorithm, wherein the machine learning algorithm is configured to output a prediction of achievable channel quality for each of the one or more secondary cells; and outputting, in response to training being completed on the machine-learning algorithm, information defining the trained machine-learning algorithm.

An exemplary computer program product includes a computer-readable storage medium bearing computer program code embodied therein for use with a computer. The computer program code includes: code for receiving multiple sets of data, the multiple sets of data comprising user equipment-related measurements taken on a primary cell in a wireless communication system and corresponding measurements of channel quality for one or more secondary cells, wherein the primary cell overlaps with the one or more secondary cells in the wireless communication system and wherein the user equipment-related measurements of the primary cell are for user equipment in the primary cell; code for performing training of a machine learning algorithm at least by applying the multiple sets of data to the machine learning algorithm, wherein the machine learning algorithm is configured to output a prediction of achievable channel quality for each of the one or more secondary cells; and code for outputting, in response to training being completed on the machine-learning algorithm, information defining the trained machine-learning algorithm.

In another exemplary embodiment, an apparatus comprises: means for receiving multiple sets of data, the multiple sets of data comprising user equipment-related measurements taken on a primary cell in a wireless communication system and corresponding measurements of channel quality for one or more secondary cells, wherein the primary cell overlaps with the one or more secondary cells in the wireless communication system and wherein the user equipment-related measurements of the primary cell are for user equipment in the primary cell; means for performing training of a machine learning algorithm at least by applying the multiple sets of data to the machine learning algorithm, wherein the machine learning algorithm is configured to output a prediction of achievable channel quality for each of the one or more secondary cells; and means for outputting, in response to training being completed on the machine-learning algorithm, information defining the trained machine-learning algorithm.

BRIEF DESCRIPTION OF THE DRAWINGS

In the attached Drawing Figures:

FIG. 2 illustrates a functional view of xRAN/ORAN architecture and interfaces;

DETAILED DESCRIPTION OF THE DRAWINGS

Figure 1A:
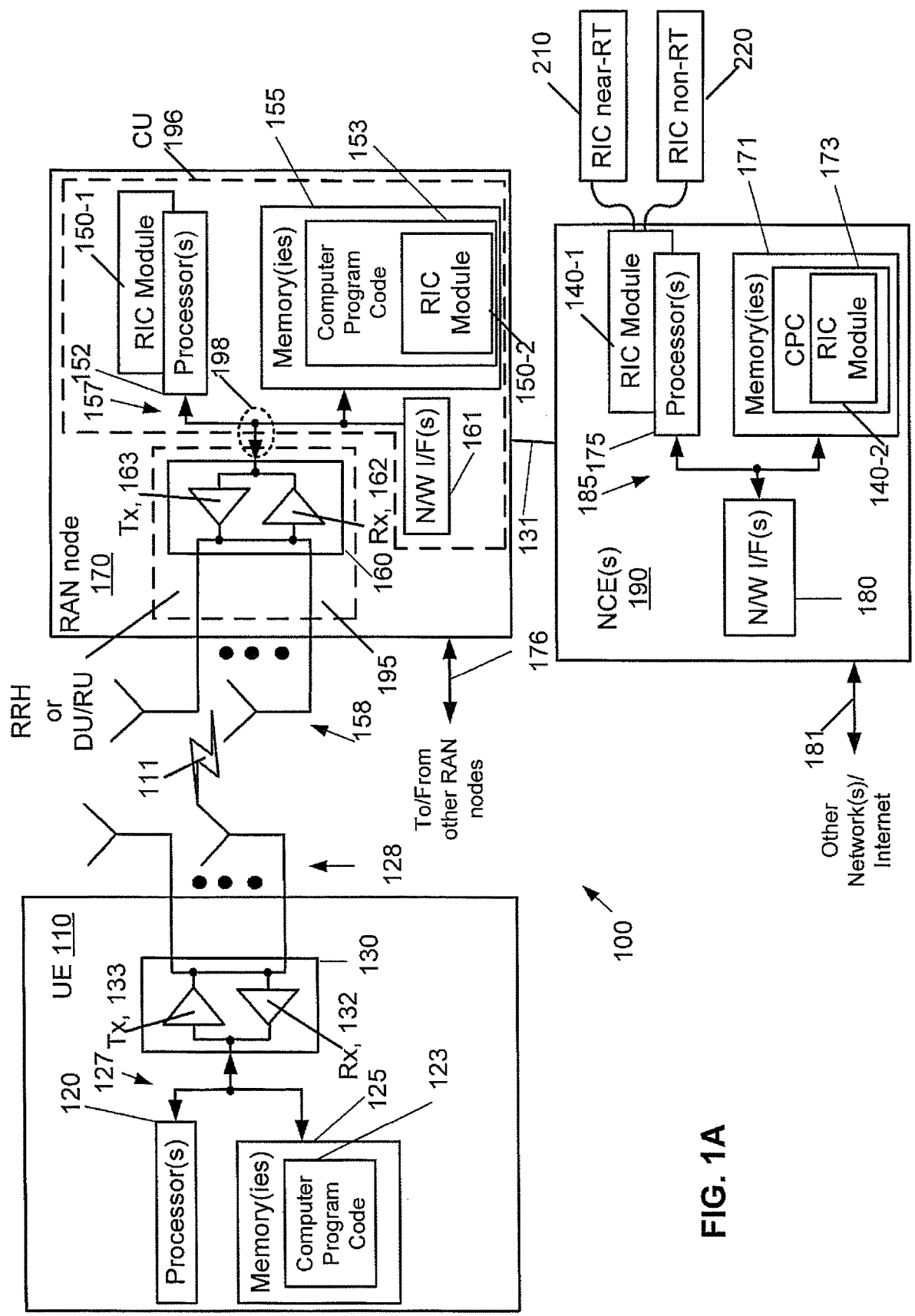
FIGS. 1A and 1B are block diagrams of one possible and non-limiting exemplary systems in which the exemplary embodiments may be practiced.

The following abbreviations that may be found in the specification and/or the drawing figures are defined as follows:

3GPP third generation partnership project
5G fifth generation
5GC 5G core network
AI artificial intelligence
aka also known as
AMF access and mobility management function
ANR automatic neighbor relation
API application programming interface
CA carrier aggregation
CPC computer program code
CSI channel state information
CQI channel quality indicator
CU central unit
CU-CP central unit-control plane
CU-UP central unit-user plane
DMRS demodulation reference signal
DNN deep neural network
DU distributed unit
eNB (or eNodeB) evolved Node B (e.g., an LTE base station)
gNB (or gNodeB) base station for 5G/NR, i.e., a node providing NR user plane and control plane protocol terminations towards the UE, and connected via the NG interface to the 5GC
EN-DC E-UTRA-NR dual connectivity
en-gNB or En-gNB node providing NR user plane and control plane protocol terminations towards the UE, and acting as secondary node in EN-DC
E-UTRA evolved universal terrestrial radio access, i.e., the LTE radio access technology
ID identification
I/F interface
info information
LTE long term evolution
MAC medium access control
MCS modulation and coding scheme
MIMO multiple input, multiple output
ML machine learning
MME mobility management entity
NCE network control element
ng or NG new generation
ng-eNB new generation eNB
NN neural network
NR new radio
N/W or NW network
NSA non-stand alone
ONAP open networking automation platform
ORAN open RAN alliance
Pcell or PCELL primary cell
PDCP packet data convergence protocol
PF proportionally fair
PHR power headroom report
PHY physical layer
PMI precoding matrix indicator
RAN radio access network
RAT radio access technology
reconfig reconfiguration
Rel release
RI rank indicator
RIC radio intelligent controller
RLC radio link control
RRC radio resource control
RRH remote radio head
RRM radio resource management
RSRP reference signal received power
RSSI received signal strength indicator
RT real time RU radio unit
Rx receiver
Scell or SCELL secondary cell
SDAP service data adaptation protocol
SE spectral efficiency
SeNB secondary eNB
SGW serving gateway
SINR signal to interference plus noise ratio
SMF session management function
SRS sounding reference signals
TS technical specification
Tx transmitter
UE user equipment (e.g., a wireless, typically mobile device)
UPF user plane function The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The exemplary embodiments herein describe techniques for optimizing Scell selection in carrier aggregation and dual/multi-connectivity for LTE AND 5G. Additional description of these techniques is presented after a system into which the exemplary embodiments may be used is described. The rest of this disclosure is divided into sections, for ease of reference.

Exemplary Systems and Configurations of Radio Intelligent Controllers (RICs)

Turning to FIG. 1A, this figure shows a block diagram of one possible and non-limiting exemplary system in which the exemplary embodiments may be practiced. In FIG. 1A, a user equipment (UE) 110, a radio access network (RAN) node 170, and one or more network control element(s) (NCE(s)) 190 are illustrated. FIG. 1A illustrates possible configurations of RICs known as a near-real time (near-RT) RIC 210 and a non-RT RIC 220. These configurations are described in more detail after the elements in FIG. 1A are introduced and also in reference to FIGS. 1B, 1C-1, 1C-2, and 1D.

Exemplary System Introduction

In FIG. 1A, a user equipment (UE) 110 is in wireless communication with a wireless network 100. A UE is a wireless, typically mobile device that can access a wireless network. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 is a base station that provides access by wireless devices such as the UE 110 to the wireless network 100. The RAN node 170 may be, for instance, a base station for 5G, also called New Radio (NR). In 5G, the RAN node 170 may be a NG-RAN node, which is defined as either a gNB or an ng-eNB. The gNB 170 is a node providing NR user plane and control plane protocol terminations towards the UE, and connected via the NG interface to the 5GC (e.g., the NCE(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU 196 is a logical node hosting RRC, SDAP and PDCP protocols of the gNB or RRC and PDCP protocols of the en-gNB that controls the operation of one or more gNB-DUs. The gNB-CU terminates the F1 interface connected with the gNB-DU 195. The F1 interface is illustrated as reference 198, although reference 198 also illustrates connection between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU 196 supports one or multiple cells. One cell is typically supported by only one gNB-DU 195. The gNB-DU 195 terminates the F1 interface 198 connected with the gNB-CU 196. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a RIC module 150, comprising one of or both parts 150-1 and/or 150-2, which may be implemented in a number of ways. The RIC module 150 may be implemented in hardware as RIC module 150-1, such as being implemented as part of the one or more processors 152. The RIC module 150-1 may be implemented also as an integrated circuit or through other hardware such as a programmable gate array. In another example, the RIC module 150 may be implemented as RIC module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. The one or more network interfaces 161 communicate over a network such as via the links 176 and 131. Two or more gNBs 170 communicate using, e.g., link 176. The link 176 may be wired or wireless or both and may implement, e.g., an Xn interface for 5G, an X1 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU 195, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 195 also indicates those suitable network connection(s).

The wireless network 100 may include a network control element (NCE) (or elements, NCE(s)) 190 that may include core network functionality, and which provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the NCE(s) 190, and note that both 5G and LTE functions might be supported. The RAN node 170 is coupled via a link 131 to the NCE 190. The link 131 may be implemented as, e.g., an NG interface for 5G, or an S1 interface for LTE, or other suitable interface for other standards. The NCE 190 includes one or more processors 175, one or more memories 171, and one or more network interfaces (N/W I/F(s)) 180, interconnected through one or more buses 185. The one or more memories 171 include computer program code (CPC) 173. The one or more memories 171 and the computer program code 173 are configured to, with the one or more processors 175, cause the NCE 190 to perform one or more operations. The NCE 190 includes a RIC module 140, comprising one of or both parts 140-1 and/or 140-2, which may be implemented in a number of ways. The RIC module 140 may be implemented in hardware as RIC module 140-1, such as being implemented as part of the one or more processors 120. The RIC module 140-1 may be implemented also as an integrated circuit or through other hardware such as a programmable gate array. In another example, the RIC module 140 may be implemented as RIC module 140-2, which is implemented as computer program code 173 and is executed by the one or more processors 120.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

Possible Configurations of Radio Intelligent Controllers (RICs)

Possible configurations are shown of RICs known as a near-real time (near-RT) RIC 210 and a non-RT RIC 220 in FIGS. 1A, 1B, 1C-1, 1C-2, and 1D. While the actual locations of these two elements have yet to be decided upon, there are a number of possibilities.

One possible instantiation of RIC non-RT 220 and RIC near-RT 210 is these are entities separate from the RAN node 170. This is illustrated by FIG. 1A, where both the RIC near-RT 210 and the RIC non-RT 220 could be implemented by a single NCE 190 or by multiple NCEs 190.

However it is also possible that the RIC near-RT 210 functionality may be a part of the RAN node 170, in a couple of cases:

1) The RAN node itself may be composed of a centralized unit (CU) that may reside in the edge cloud, and so the RAN CU and the RIC near-RT 210 would be at least collocated, and may be even combined; or 2) The RIC near-RT 210 functionality may be possibly hosted inside a RAN node 170.

Figure 1B:
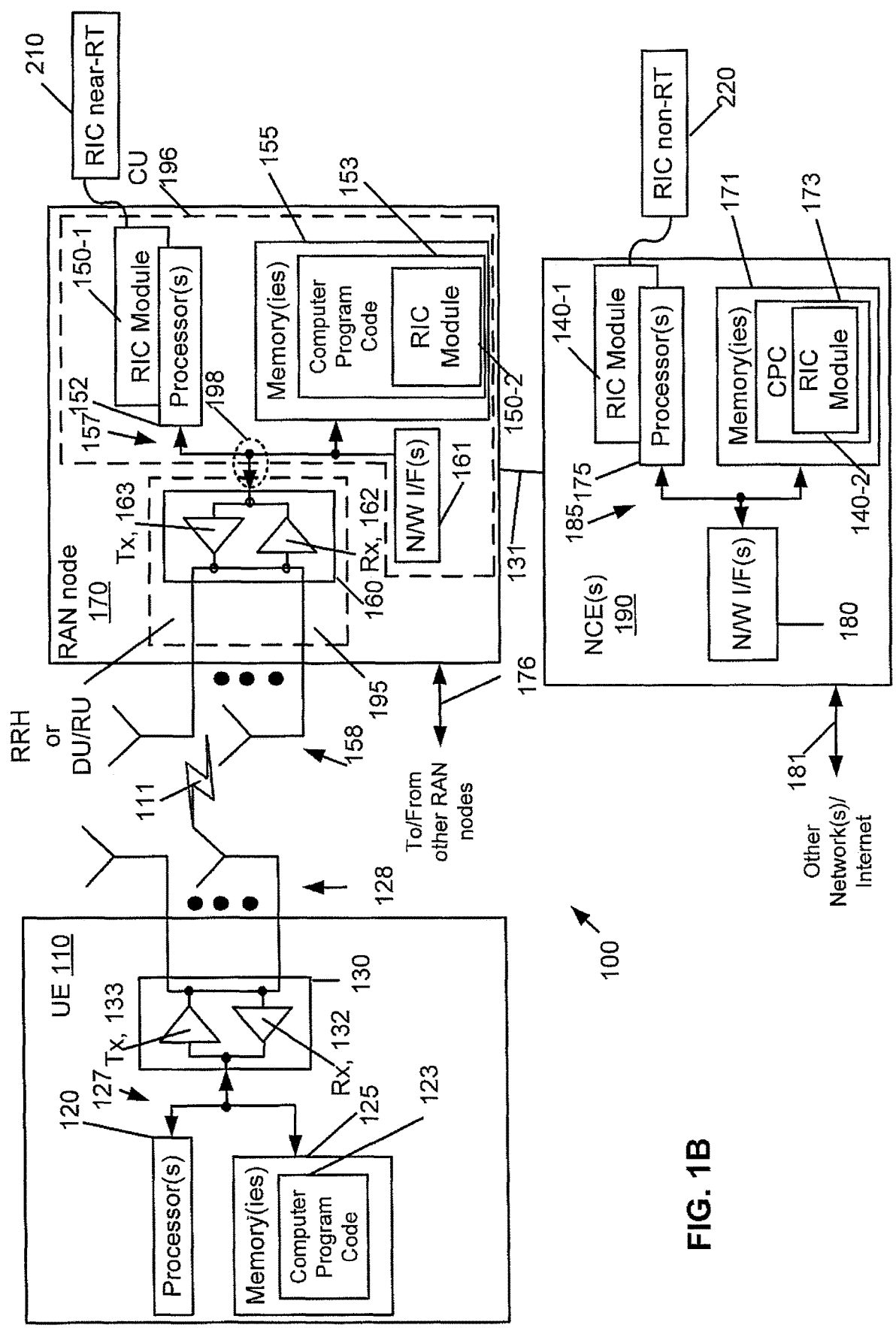

FIG. 1B illustrates that the RIC near-RT 210 may be implemented in the RAN node 170, e.g., combined with the RIC module 150 (e.g., as part of RIC module 150-1 as shown or RIC module 150-2 or some combination of those). In this example, the RIC non-RT 220 would be implemented in the NCE 190, e.g., as part of the RIC module 140 (e.g., as part of RIC module 140-1 as shown or RIC module 140-2 or some combination of those).

Figures 1, 1C:
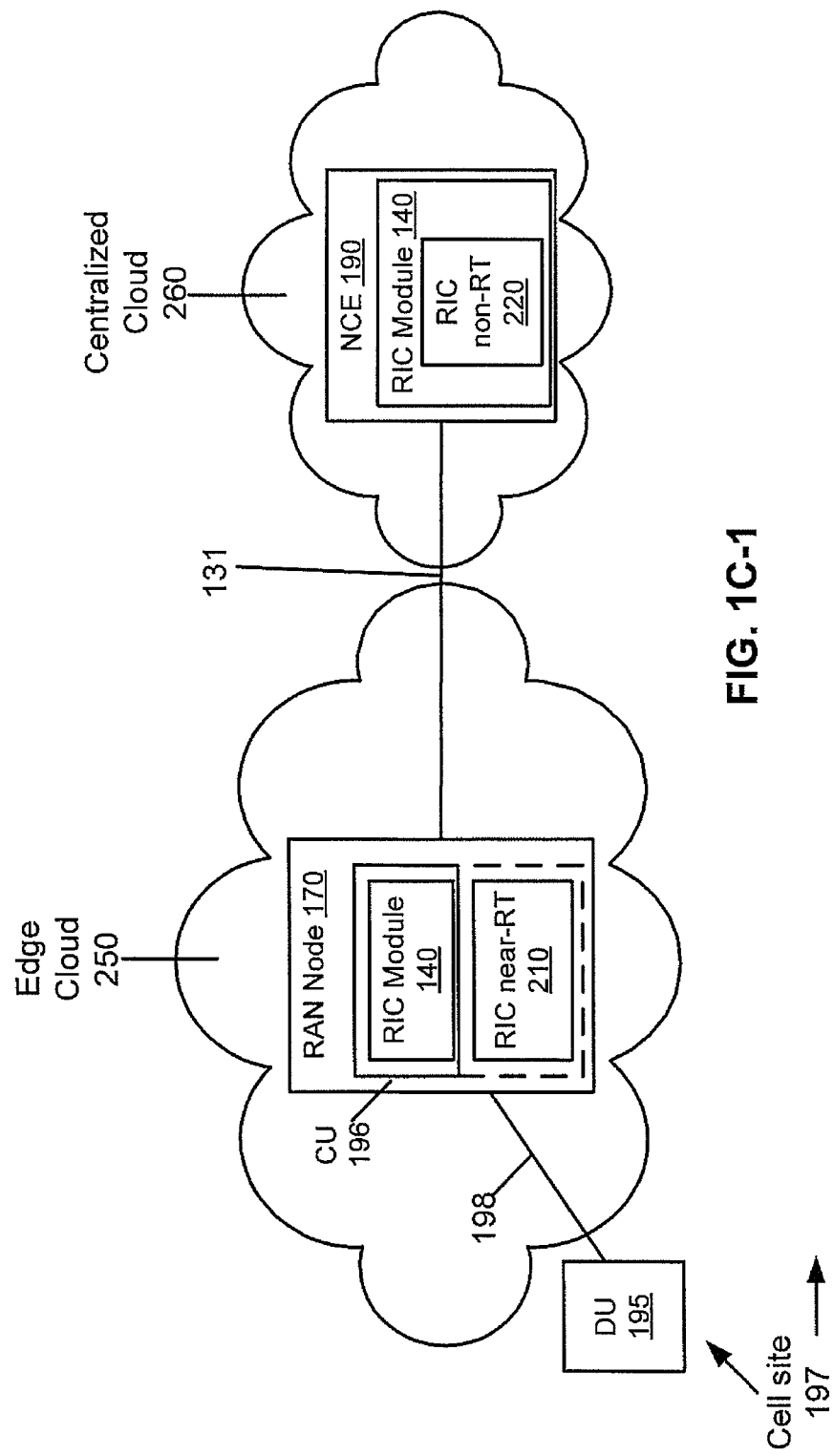
FIGS. 1C-1, 1C-2, and 1D are block diagrams of exemplary configurations of the non-real time (non-RT) and near-RT radio intelligent controllers (RICs) from FIG. 1A.

FIG. 1C-1 illustrates a RAN node 170 in an edge cloud 250. The RAN node 170 includes a CU 196 that includes the RIC module 140 and, as a separate entity, the RIC near-RT 210. The separate RIC near-RT 210 could be implemented by the processor(s) 152 and memories 155 (and/or other circuitry) by the RAN node 170 or have its own, separate processor(s) and memories (and/or other circuitry). This is the collocation from (1) above. The combined aspect of (1) above is illustrated by the dashed line around the RIC near-RT 210, indicating the RIC near-RT 210 is also part of the CU 196. FIG. 1C-1 also illustrates the RIC near-RT 210 may be implemented as part of the RIC module 140 in a NCE 190 that is in a centralized cloud 260. In the example of FIG. 1C-1, the DU 195 will be typically located at the cell site 197 and may include the RU.

The edge cloud 250 may be viewed as a "hosting location", e.g., a kind of data center. Multiple elements may be hosted there, such as the CU, RIC, core network elements such as MME/SGW or NGC, and yet other functions like MEC (mobile edge computing) platforms, and the like.

Figures 1, 1C, 2:
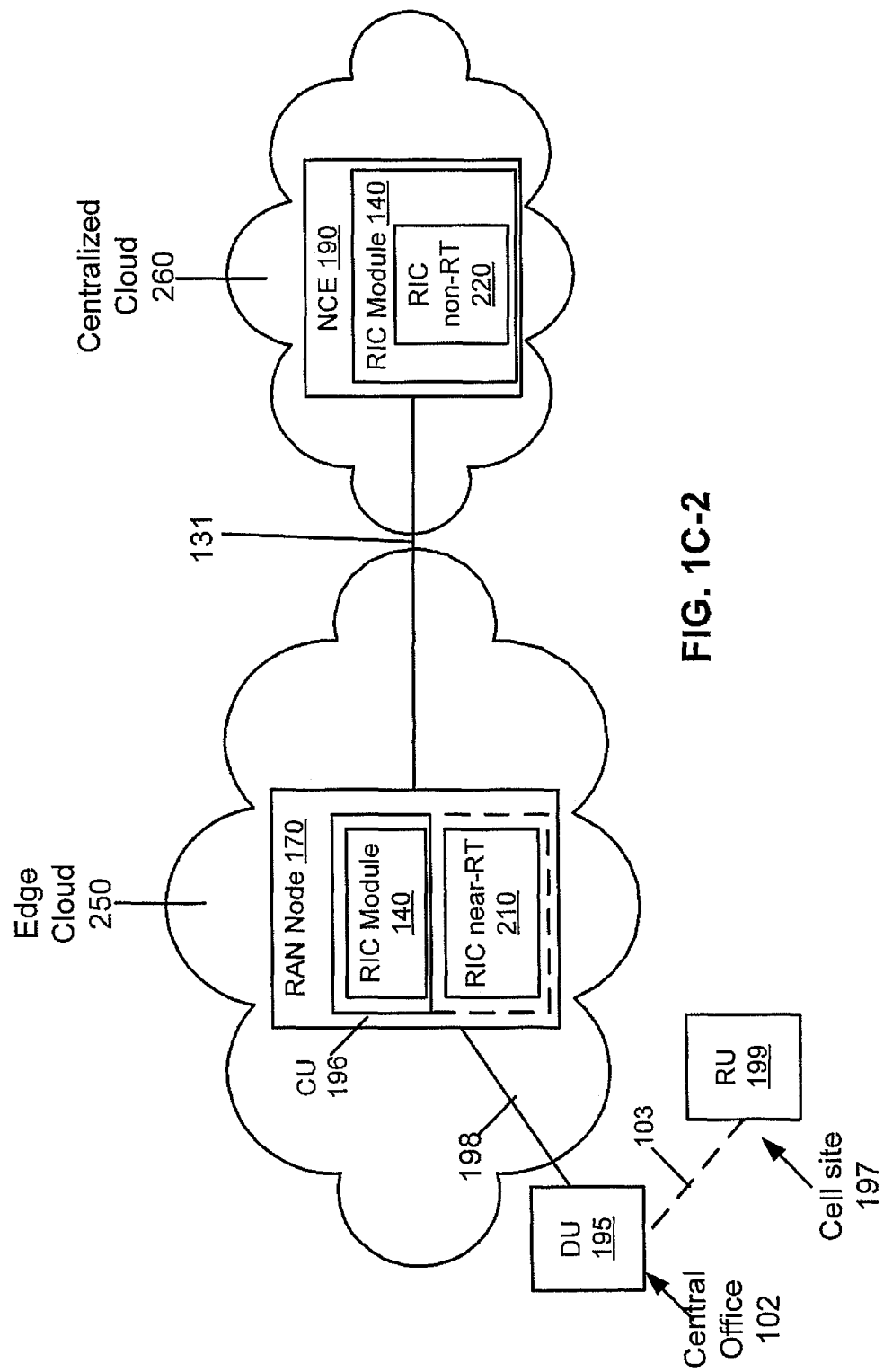

In the example of FIG. 1C-2, the DU 195 could also be located in a central office 102, in so-called Centralized-RAN configurations. In these configurations, the DU 195 is at the central office 102, but the RU is at the cell site 197, and the DU 195 is interconnected to the RU typically by a fiber network 103 or other suitable network (the so-called "Fronthaul").

Figure 1D:
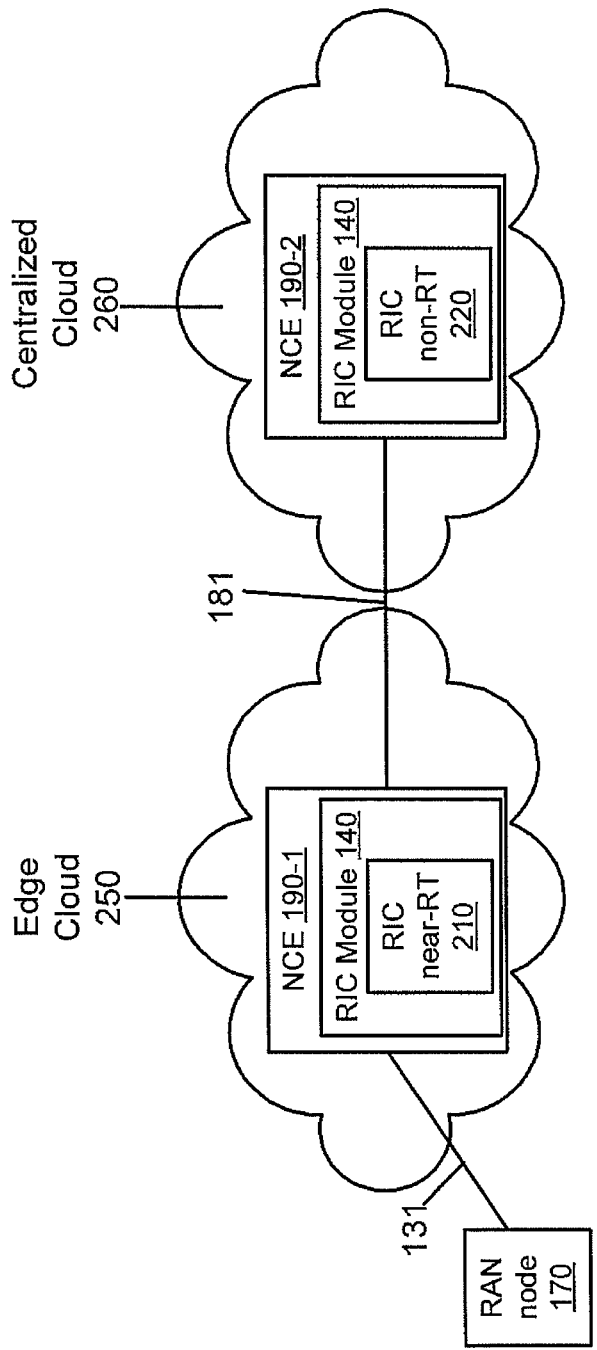

It is also possible the RIC near-RT 210 may be located at an edge cloud, at some relatively small latency from the RAN node (30-100 ms has been discussed), while the RIC non-RT 220 may be at a greater latency likely in a centralized cloud. This is illustrated by FIG. 1D, where NCE 190-1 is located at an edge cloud 250 and comprises the RIC module 140 which incorporates the RIC near-RT 210. The RIC non-RT 220, meanwhile, is implemented in this example in the RIC module 140 of another NCE 190-2 in the centralized cloud 260.

Having thus introduced one suitable but non-limiting technical context for the practice of the exemplary embodiments of this invention, the exemplary embodiments will now be described with greater specificity.

Additional Introduction

As described above, the xRAN consortium has an effort to create a Radio Intelligent Controller (RIC) (e.g., an xRAN controller platform), which typically is defined with two parts, a RIC near-real time (near-RT) portion and a RIC non-RT portion. Both of these might be used for machine learning systems, though the non-RT portion is assumed to operate over a longer period of time than does the near-RT portion, which is assumed to operate in close to real time. FIG. 2 illustrates a functional view of xRAN/ORAN architecture and interfaces. This example has a policy/orchestration engine 240, such as ONAP. The policy/orchestration engine 240 includes policy 235 (e.g., stored in a database) and the RIC non-RT 220. The RIC non-RT 220 may be used for model training and other features. There is an A1 reference point 221 between the policy/orchestration engine 240 and the RIC non-RT 220.

The RIC near-RT 210 in this example comprises RAN/RRM optimization algorithms 215, analytics toolkits 205, data gathering 255 (e.g., for storage, streaming, and the like), and a control API 211. The RIC near-RT 210 is also known as (aka) an xRAN controller. There is an E2 reference point 230 (in ORAN) between the RIC near-RT 210 and the RAN node 170. The E2 reference point is also known as B1 in xRAN.

The RAN node 170 comprises a CU 196 which comprises a part for the control plane, CU-CP 265, and a part for the user plane, CU-UP 270. The CU 196 communicates with the DU 195 using these parts 265, 270. The DU 195 communicates with and controls the radio unit (RU) 280. The RAN node 170 in this example might contain one or both of eNB or gNB functionality.

As also indicated above, one application of these is to help the cellular network perform cell selection for user equipment (UE). Such cell selection may be based upon carrier aggregation (CA) or dual-connectivity (DC) or multi-connectivity (MC). Carrier aggregation is a key functionality of RAN in LTE and 5G, allowing UEs to connect simultaneously to cells on multiple carriers, enabling the UEs to reach higher throughputs as well as enabling fast-time-scale load-balancing across multiple carriers. A UE will generally have a primary cell, known as a Pcell (typically the cell through which the UE first connects to the RAN). The RAN (typically via the Pcell) may provide the UE additional configuration information to enable it to simultaneously connect to additional cells on carriers other than the Pcell, which are known as the UE's Secondary cells or Scells. The RAN node 170 decides which cells (e.g., carriers) should be configured as Secondary Cells (Scells) for a given UE 110. In carrier aggregation, a UE's data stream across the Pcell and different Scells is typically aggregated at the RLC layer. An Scell may be hosted at the same RAN node as the Pcell (intra-site carrier aggregation), or a different RAN node (inter-site carrier aggregation). Either Pcell or Scell may flexibly use radio access technologies such as LTE or 5G/New Radio (5G/NR). In dual connectivity (or multi-connectivity) as well, a UE can connect simultaneously to multiple cells. Typically a given UE's secondary cells in DC or MC will be hosted at different RAN nodes than the RAN node hosting the UE's Pcell. The Pcell RAN node (called MeNB or Master eNB) can interact with the RAN node hosting the secondary cell (called SeNB or Secondary eNB) over an interface such as X2 or Xn. Dual connectivity or multi-connectivity may even be used together with carrier aggregation, for example wherein a UE connects to a given SeNB by dual connectivity, and then enters carrier aggregation with multiple Scells hosted at that SeNB. Either MeNB or SeNB may flexibly use radio access technologies such as LTE or 5G/New Radio (5G/NR). Embodiments described herein may often refer to carrier aggregation and selection/assignment of Scells for UEs, but it should be understood that this broadly encompasses dual and multi-connectivity (and the selection of SeNBs for UEs), as well as the possible combined usage of carrier aggregation and dual connectivity. In general the term 'carrier aggregation' may be broadly used to encompass also dual and multi connectivity, and the term 'Scell' may be used broadly to also encompass SCG or SeNB, and the term 'Pcell' may be used broadly to also encompass MeNB.

A likely deployment scenario is that the Scells may be on different bands (that is, carriers) than the UE's primary cell (Pcell), and thus may have significantly different signal and interference characteristics than the Pcell. For instance, the Pcell may be on a lower band (e.g., 700 or 800 MHz) while the Scell may be on 2.6 GHz or 3.5 GHz.

The Pcell is quite likely to be a macro-cell. But the Scell may be either (i) a macro cell hosted at the same site as Pcell, or (ii) a macro cell hosted at a different site than the Pcell or (iii) a small cell hosted at a different site.

Figure 3A:
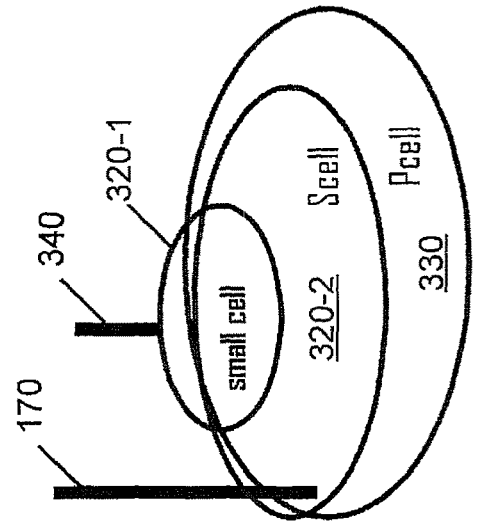
FIGS. 3A and 3B are examples of small cell, Scell, and Pcell deployment scenarios.
Figure 3B:
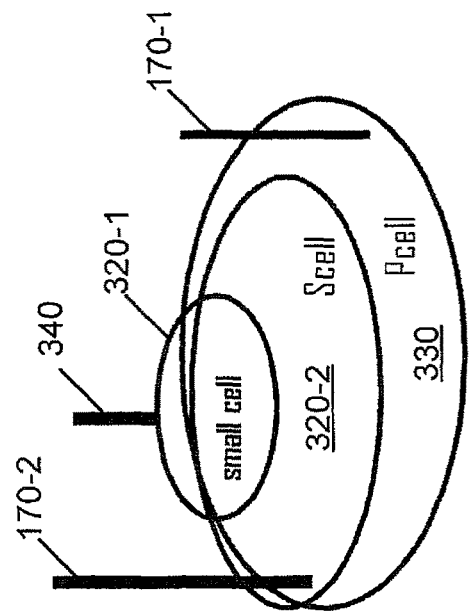
Figure 2:
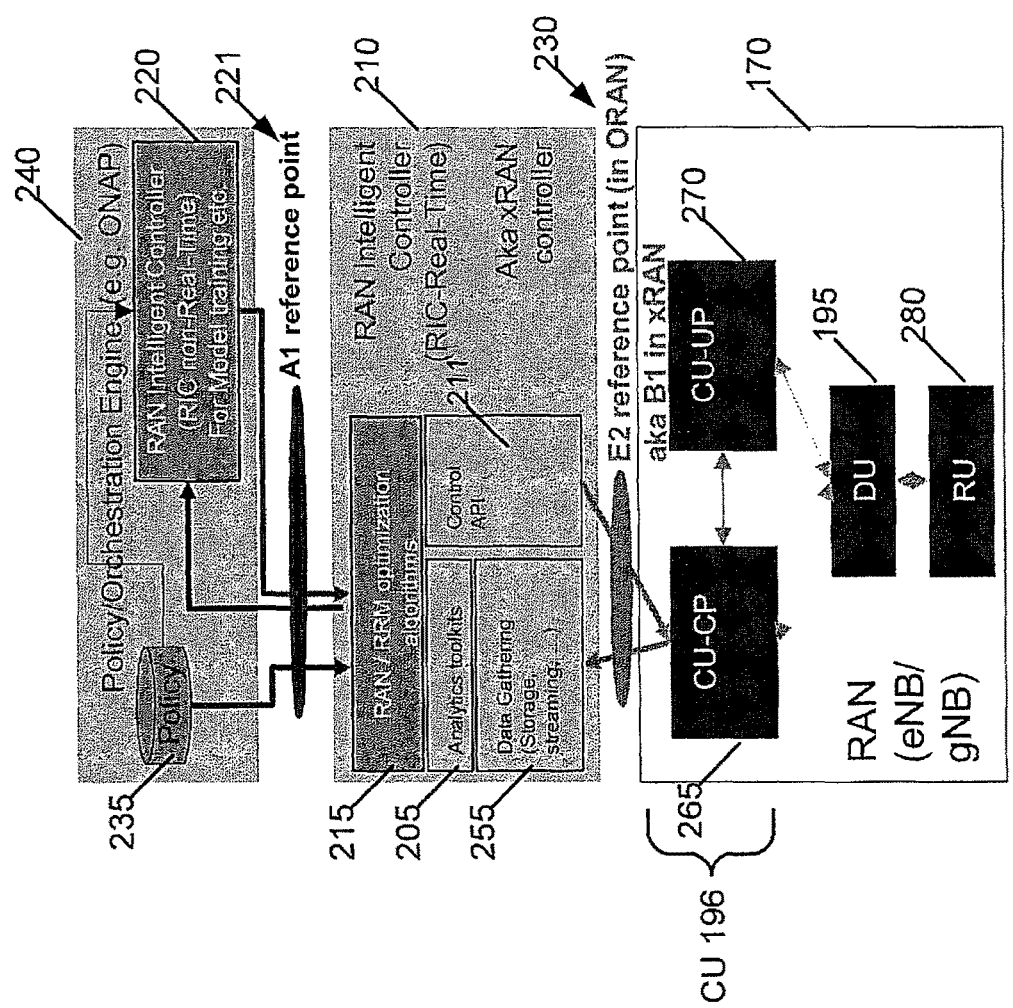

FIGS. 3A and 3B are examples of small cell, Scell, and PCell deployment scenarios. In FIG. 3A, both the PCell 330 and Scell 320-2 are formed by the RAN node 170, while the small cell 320-1 is formed by another RAN node 340. This illustrates (i) and (iii). In FIG. 3B, the PCell 330 is formed by the RAN node 170-1, the Scell 320-2 is formed by the RAN node 170-2, and the small cell 320-1 is formed by another RAN node 340. This illustrates (ii) and (iii).

With respect to (ii), for instance, if Scells 320 are on 3.5 GHz while the Pcell 330 is at 700 Mz, the 3.5 GHz band may need a more dense deployment than 700 MHz, with many more sites hosting 3.5 GHz than 700 MHz. So in this case from the perspective of a given 700 MHz cell, there may be multiple 3.5 GHz cells which can be potential Scells 320.

With respect to (iii), for instance, small cells 320-1 may be on street lamps or sides of buildings, and there may be multiple small cells 320-1 within the coverage of a macro cell (e.g., Pcell 330).

One consequence of the above observations is that the signal to interference and noise ratio (SINR) experienced by a UE (and consequently, the spectral efficiency or CQI achievable by the UE) on a given Scell 320 may be quite different than the SINR (or equivalently, spectral efficiency, or channel quality indicator (CQI)) of the UE on the Pcell 330.

A UE connected to PCell 330 would normally only report channel quality indicators and other measurements related to the channel conditions the UE observes for the Pcell 330. Since the channel conditions on other Scells are not observed by the UE and since those may be quite different than the UE's channel conditions on Pcell 330, one issue therefore is that when selecting a cell (such as cell 320-1 or cell 320-2) to configure as an Scell for a given UE connected to a given Pcell 330, the RAN node 170 does not have any direct information on the spectral efficiency by a given UE on potential Scells 320-1 or 320-2. Due to this, for example, a theoretically optimal selection of an Scell for a given UE, which would take into account both the load on the candidate Scells 320-1 and 320-2 and the UE's achievable spectral efficiency on the candidate Scells 320-1 and 320-2, is not possible in practice. For instance, to maximize log utility and achieve proportional fairness, a theoretically optimal decision would be to select the Scell which maximizes the ratio of spectral efficiency of the UE on the Scell to a load (represented by a 'proportionally fair metric') of the Scell. This requires knowledge of the spectral efficiency of the UE on the candidate Scells such as 320-1 and 320.

One possible approach is that the RAN node 170 can request the UE 110 to provide reference signal received power (RSRP) measurements on potential candidate Scells. However, this has some significant drawbacks: (i) the UE has to spend significant battery power trying to measure signal strength on the candidate Scells when the UE may not even be within the coverage of an Scell, as the Scells may have limited coverage relative to UE's Pcell; (ii) making such inter-frequency measurements requires measurement gaps (i.e. transmission interruptions on the Pcell that would allow the UE to perform measurements on cells such as Scells that are on other carriers), so the UE loses throughput on Pcell; and (iii) even if RSRP can be measured, RSRP does not directly translate to SINR or spectral efficiency that the UE can achieve on the Scell.

Thus, one issue is how to devise a way to predict the channel quality (e.g., SINR or spectral efficiency) achievable by a UE on a given Scell, without incurring the overhead that would be needed for all UEs to make inter-frequency measurements on candidate Scells and while accounting for the potentially different coverage areas and channel conditions of Scells relative to Pcells.

It should be noted that, while the above is described for carrier aggregation Scell selection, essentially the same problem also applies in selecting SeNBs for dual-connectivity or multi-connectivity (in LTE or 5G, or in LTE/5G NSA multi-RAT systems). So we will interpret 'carrier aggregation' and 'Scell selection' more generally as also including such 'dual/multi-connectivity'.

Additional Description of Exemplary Embodiments

In an exemplary proposed method, we propose a particular application of, e.g., an xRAN controller for optimally determining assignments of carriers (and their corresponding Scells) to UEs for carrier aggregation and dual/multi-connectivity, exploiting the xRAN/ORAN architecture and interfaces.

Figure 4:
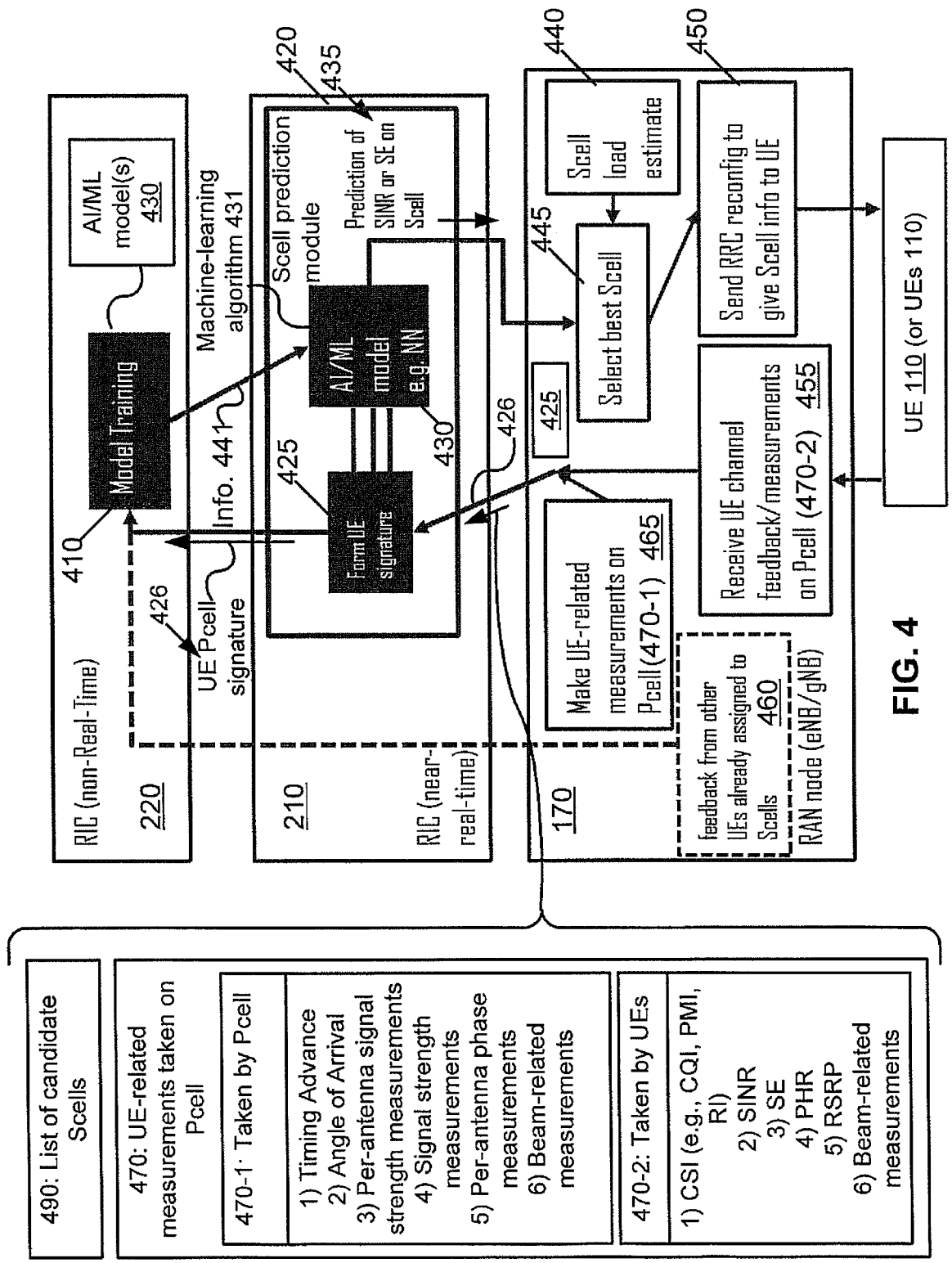
FIG. 4 is a block diagram of an exemplary embodiment of a system of entities, and illustrates messaging and operations performed by the entities in the system.

More detail is provided with reference to FIG. 4, which is a block diagram of an exemplary embodiment of a system of entities, and illustrates messaging and operations performed by the entities in the system. The entities performing operations are the RIC non-RT 220, the RIC near-RT 210, the RAN node 170, and the UE 110.

A RIC non-RT 220 can perform model training with a model training module 410, using one or more artificial intelligence (AI)/machine learning (ML) models 430 such as neural networks (NN). This model 430 (or models 430) may be a machine learning algorithm 431, which may broadly encompass a variety of artificial intelligence methods such as neural networks of various kinds (e.g., deep neural networks), or statistical or mathematical methods such as regression or support vector machines or clustering. The illustration of the model 430 also has an AI component to indicate the possibility that an AI method such as a neural network is a possible implementation. In the text below, a NN is assumed, but not a necessary component. This model 430 is also referred to below as the Scell channel quality prediction model. The RIC near-RT 210 also has the AI/ML model 430.

An Scell prediction module 420 (which can be hosted at the RIC near-RT 210) may be used to predict the channel quality (e.g., spectral efficiency (SE) or SINR or CQI) achievable by a UE 110 on a given candidate Scell 320. The Scell prediction module 420 also supports an interface towards a RAN node 170 for (i) receiving data from the RAN node 170; and (ii) providing a prediction 435 of the achievable SINR or SE achievable by a given UE. The interface is mappable to E2 interface in ORAN, formerly known as B1 interface in xRAN. See FIG. 2 for instance.

The Scell prediction module 420 receives from the RAN node 170 a list 490 of one or more candidate Scells. The RAN node 170 may determine this using any known method—e.g., based on ANR procedures or eNB/gNB configuration parameters. The Scell prediction module 420 receives data from the RAN node 170 related to one or more UEs, comprising radio/channel measurements made by the UE on its primary carrier. See block 455. Additionally, in block 465, the Pcell (i.e., the RAN node 170) makes UE-related measurements on the Pcell. These measurements may include one or more of the following for the P cell (note that additional measurements are described below):

CQI (instantaneous or suitably averaged/filtered);

RSRP to Pcell, and optionally RSRPs to multiple neighbor cells on the same carrier as Pcell, which is reported by the UE to the RAN node;

Timing advance, which is estimated by the eNB from the UE's uplink received signal, typically from RACH transmissions (which is a measure of distance from the RAN node 170);

Angle of arrival of UE signals at the RAN node 170, which typically is measured/estimated at the RAN node 170 from the UE's uplink received signal (either data (PUSCH) or control (PUCCH or RACH or SRS or DMRS) channel uplink transmissions);

Per-antenna received signal-strength measurements—RSSI or received signal strength at each antenna on the Pcell, measured at the eNB from the UE's uplink received signal—typically from SRS or PUCCH or PUSCH;

Antenna phase measurements; and/or

Beam indication or beam direction indication, for example in a MIMO (multiple-input multiple-output) system—these may be based either on information reported by the UE or based on measurements made from UE transmissions such as sounding reference signals (SRS).

Concerning CQI, the UE reports CQI to the RAN node. The RAN node may further apply filtering/averaging (e.g., a sliding window average or exponential average) to the reported CQI to form, e.g., a longer-term average CQI.

Although we have used the term "CQI", one could also include also PMI and RI because these (CQI, RI, PMI) together form the UE's "channel state information" (CSI).

As mentioned, RI (rank indicator) and PMI (precoding matrix indicator) are reported by the UE in MIMO to indicate if the channel to the UE would allow multiple simultaneous MIMO streams (the "rank" of the channel covariance matrix), and the precoder that the eNB (or other RAN node 170) should use for beamforming.

Regarding the per-antenna received-signal-strength measurements, typically Pcell will be low-band, and so likely only 2 or 4 antennas will be used. Nonetheless, it may still be useful compared to RSRP, as RSRP requires RRC overhead while received signal strength is measurable by just the RAN node 170, and hence is more reflective of 'instantaneous' channel conditions than RSRP.

In more detail, there are a number of UE-related measurements 470 that are taken on the Pcell 330. Some of these are UE-related measurements 470-1 taken by the Pcell in block 465 and some of these are UE-related measurements 470-2 taken by the UEs (e.g., by a specific UE) and received in block 455. The UE-related measurements 470-1 taken by the Pcell may include one or more of the following: 1) Timing Advance; 2) Angle of Arrival; and/or 3) Per-antenna signal strength measurements 4) Signal strength measurements; 5) Per-antenna phase measurements; and/or 6) Beam-related measurements. The UE-related measurements 470-2 taken by the UEs (e.g., by a specific UE) may include one or more of the following: 1) CSI (one or more of CQI, PMI, or RI); 2) SINR; 3) SE; 4) PHR; 5) RSRP and/or 6) Beam-related measurements. The beam-related measurements address the case where the Pcell may have multiple beams in a massive MIMO system. More detail is presented below about these measurements.

The Scell prediction module 420 determines a prediction 435 of channel quality (e.g., spectral efficiency or SINR or CQI or some combination of these) achievable by the UE 110 on one or more Scells. The prediction can use AI/ML techniques such as a neural network in model 430 (or neural networks in models 430). Additional details are described below. The Scell prediction module 420 provides to the RAN node 170 the prediction 435 of the achievable channel quality (e.g., SINR or SE or CQI) of the UE on one or more Scells.

The RAN node 170 can then make (see block 445) a selection of the best Scell (possibly multiple Scells 320) for the UE 110 based on the channel quality prediction as well as other factors such as load of the Scell. For instance, block 440 provides an input to block 445 of the Scell load estimate. The selection of the best Scell may be performed, for example, by examining a ratio of the predicted channel quality on each Scell to the load on that Scell, and selecting the Scell which has the highest ratio. Other criteria may be used, for example using the load as a criterion to determine a weighting for each cell to be applied to the predicted channel quality, where candidate Scells with a higher load receive a lower weighting. The RAN node 170, in response to the selection of the best Scell, sends RRC reconfiguration (reconfig) information to provide Scell information to the UE 110 for the selected Scell. See block 450. It is noted that if the RAN node sends Scell reconfig information (see block 450) for multiple Scells, the UE should try to connect to all of them. Of course it is possible that the UE may reach the coverage area of some but not all of the Scells, and so cannot connect to all, but typically the UE should not be filtering out Scells otherwise.

Note that it is possible that the selection of the best Scell in block 445 may be performed even if there is only a single Scell 320 that overlaps the Pcell 330. There is no true "selection" between Scells 320 to be performed as such since there is only one Scell, but the method would still enable choosing "when" to provide the UE with configuration (e.g., in block 450). So providing configuration too early (before the UE is anywhere close to the range of the S cell) may be wasteful in terms of the UE's trying to search/measure the Scell. The system could use the same method of predicting the channel quality/spectral efficiency of the UE on the one Scell, and providing the RRC reconfiguration (reconfig) information in block 450 only when the predicted spectral efficiency is "not too low", e.g., meets some threshold. One could still think of this as "selecting" an Scell as opposed to "not selecting" the Scell, so the selection in block 445 may also include determining a suitable time at which the (single) Scell should be selected and information should be provided to a UE based on the predicted channel quality.

Figure 7:
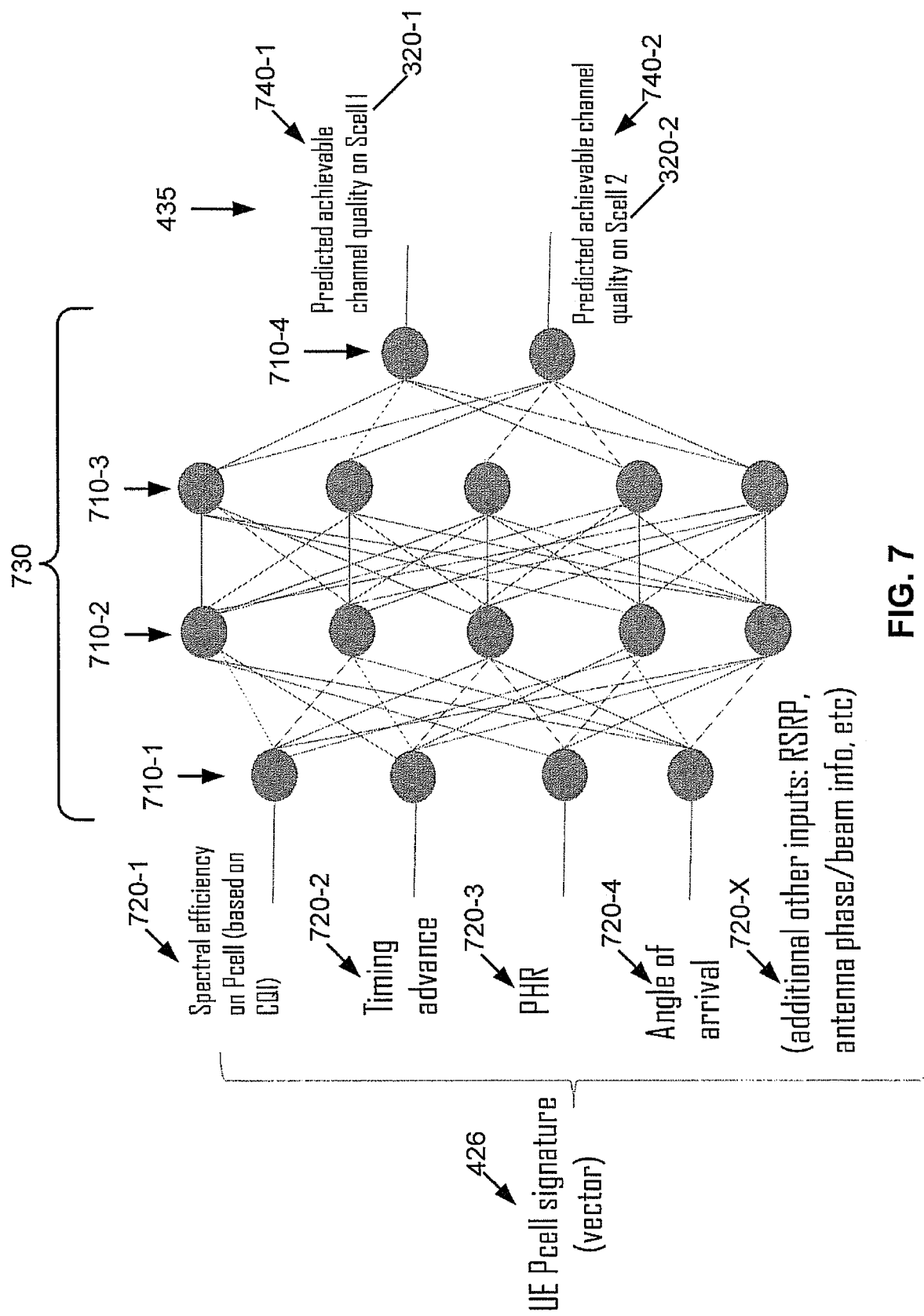
FIG. 7 is an illustration of an exemplary AI/ML model, which is a deep neural network (DNN), and its inputs and outputs, in accordance with an exemplary embodiment.

The Scell prediction module 420 supports an interface towards RIC non-RT 220 to facilitate Scell channel prediction model training by the model training module 410. The interface is mappable to A1 interface in ORAN/xRAN. See FIG. 2. The Scell prediction module 420 forms a "UE Pcell signature" 426 based on the received data and communicates this UE Pcell signature 426 to the RIC non-RT 220. See block 425. An example of the "UE Pcell signature" 426 is described in more detail in reference to FIG. 7. Note that the primary examples herein have block 425 performed by RIC near-RT 210 and its Scell prediction module 420, but the forming of the UE signature in block 425 may be performed by the RAN node 170, which would send the UE Pcell signature 426 toward the RIC near-RT 210. In this context, there may be no need for the RIC near-RT 210 to further form a signature, though in principle the RIC near-RT 210 may perform some further processing on the signature before feeding it to the prediction module (e.g., the AI/ML model 430). The Scell prediction module 420 receives from the RAN node 170 data of UEs 110 that have already been assigned Scells 320, relating to the radio/channel measurements of those UEs 110 on those Scells 320. See block 460. This feedback should include UE-related measurements on the Pcell (either made by the Pcell or reported by the UE, e.g., as in references 470-1 and 470-2), as well as UE-related measurements for those UEs on their assigned Scells. The Scell-related measurement would typically comprise channel quality measurements—either CSI (including CQI/PMI/RI as above) and/or RSRP). The Scell prediction module 420 provides that data (or an aggregate or transform of that data) to the RIC non-RT 220.

Regarding the training performed by model training module 410, the training could operate in the following way. Assume UE1, UE2, . . . UEn all have a given primary cell, say cell1, and they have all been assigned a given Scell, say cell2. For each of these UEs, the system may determine the measurements from the Pcell (cell1): Consider the Pcell measurements being used are (CQI on Pcell, Timing Advance on Pcell, PHR on Pcell, Angle of Arrival on Pcell), and this comprises a vector for that particular UE. This vector is the "UE Pcell signature 426", for instance. For the measurements from n UEs, there would be n vectors X1, X2, . . . Xn for then UEs. These Xi vectors will be the input to the model 430. Thus our vectors can form a matrix X=X1, . . . Xn, one sample from each UE (each is a "training example", also called "training data"). In practice, the UEs will keep generating these measurements periodically, so over time the system will collect many samples from each of multiple UEs, but to keep things simple, assume there is one measurement (vector) from each UE.

For each of these UEs, we also obtain certain measurements of interest from cell2: One possible measure is the CQI as a measure of channel quality, but we could use the same method for other characteristics of interest too, such RSRP, other CSI, and the like. Assume for ease of reference for each of these UEs we have the CQIs, which will be referred to as Y1, . . . Yn.

Consequently, for each "training example", we have input "Xi" and output "Yi"—this is our training set (also called a data/label pair), which the system will use to train the neural network model, as one implementation of AI/ML model 430. Training can be by well-known neural network algorithms—back propagation/steepest descent, and the like.

In additional detail regarding training by the model training module 410, the training based on the data 460 of UEs that have been assigned Scells may proceed in an exemplary embodiment as follows. Consider one of multiple UEs, and suppose this UE has been assigned Scells S1, S2, S3, and its Pcell is P1. Assume we have a vector of that UE's measurements on these Pcell, $v_P$. For each of the Scells, assume we have also a vector of measurements $v_{S1}$, $v_{S2}$, $v_{S3}$. For example, $v_{S1}$ could be just the CQI of UE on Scell S1, or this vector could be (CQI, RSRP) of the UE on Scell S1, or some similar measurement of channel quality. Thus we have a training sample that when the UE had measurements $v_P$ on the Pcell P1, the UE had measurements $v_{S1}$ on cell S1, $v_{S2}$ on cell S2, and so on. Now we can collect many such training samples—from the same UE at different times, and/or from other UEs.

We can train a neural network, as a AL/ML model 430, with the following inputs and outputs:

Input=vector of Pcell measurements on P1; and
Output=vector of channel quality on Scell S1.

A neural network is therefore trained to predict the channel quality on Scell S1 for UEs whose Pcell is P1, and for training this neural network one could use just the info for $v_{P1}$ and $v_{S1}$.

Similarly, we can train a second neural network to predict the channel quality on Scell S2 for UEs whose Pcell is P1, and for training this neural network we would use just the info for $v_{P1}$ and $v_{S2}$.

And so on, separate neural networks for each Scell. This version entails multiple models 430, each model comprising a NN such as a DNN.

Once the model 430 is trained, we can apply it to other UEs. The information (info.) 441 is information that defines the AI/ML model(s) 430 or corresponding machine-learning algorithm 431. For instance, for a NN or DNN, the information 441 can define and indicate weights and structure (e.g., number of layers and nodes, inputs, outputs) of the corresponding NN/DNN. Given a vector $\hat{X}$ representing Pcell measurements on cell 1 of some other UE, the model 430 will predict the CQI $\hat{Y}$ representing the CQI that the model 430 determines the UE can achieve on that particular Scell, cell2. Note that the output $\hat{Y}$ is a "continuous" quantity here, not a label like "cat" as in image classification. So the NN is performing a form of "regression" rather than "classification".

As described above, the model 430 takes as input a UE's measurements on a given Pcell (cell1) and outputs a prediction of the UE's CQI on a given Scell (cell2). With this approach, for each (cell1, cell2) pair, we would have a different model. In principle we could also try to create some bigger neural network which is a common predictor across all (cell1, cell2) pairs, in which case the input vector could be ((UE's Pcell measurements), Pcell identifier, Scell identifier), and the output could be Scell CQI on the particular Scell identifier specified in the input. The same logic as above applied, but now one can place all measurements on all Pcells and Scells into a common large training set and train one bigger model 430.

In additional detail, we could train a "combined" neural network (as a single model 430) which at one effort predicts the channel quality on all the Scells S1, S2, S3. In this case, the neural network takes as input the vector of Pcell measurements on P1, and outputs a vector (v1, v2, v3) where v1 is channel quality on S1, etc. To train this neural network, each training sample consists of input $v_{P1}$ and output ($v_{S1}$, $v_{S2}$, $v_{S3}$) (e.g., ordered according to cell ID).

It is possible the first implementation is easier—since a given UE may not have measurements on all the possible Scells, there may be "non-existent data" for some Scells. If separate neural networks are trained for each Scell, then one can feed the training process just the information about cells for which you actually have measurements. In the "combined neural network" approach, one would have to deal with missing or incomplete data, which can be done, but is possibly more cumbersome.

The Scell prediction module 420 receives from the RIC non-RT 220 a descriptor of an AI/ML model 430 (e.g., neural network configuration and weights) for Scell channel quality prediction, and this information defined the AI/ML model 430. The Scell prediction module 420 uses the defined and received AI/ML model 430 in determining the prediction of channel quality (e.g., spectral efficiency or SINR or CQI or some combination of these) achievable by a UE on one or more Scells.

Figure 5:
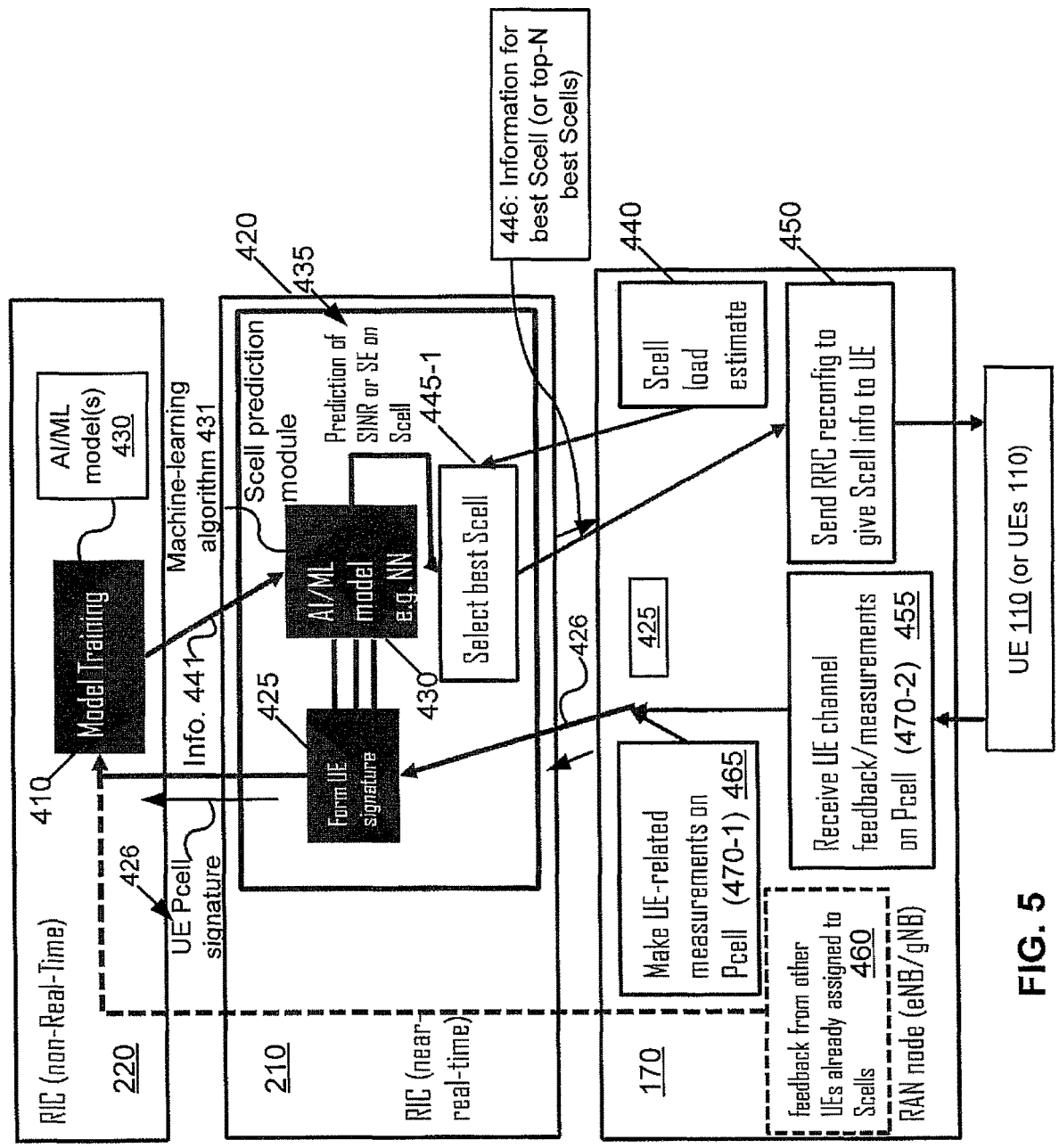
FIG. 5 is a block diagram of an exemplary embodiment of a system of entities, and illustrates an enhancement to FIG. 4.

A potential enhancement is that the Scell prediction Module 420 performs the best Scell selection. See FIG. 5. That is, instead of the Scell prediction module providing just the Scell channel quality prediction to the RAN and letting the RAN node determine the best Scell selection, one option is to have the Scell prediction module further determine the best Scell for the UE as well. In this case the Scell prediction module 420 would perform the following:

Receive information about the load on UE's Pcell and candidate Scells from RAN nodes;

Determine the Scell channel quality prediction for the UE on one or more candidate Scells;

Select (see block 445-1) the best Scell (or top-N Scells) for the UE taking into account both the load on Scells as well as the UE's achievable channel quality on the Scells, and other factors may be taken into account such as the band or carrier combinations supported by the UE, the UE capabilities, and the like; and Provide information 446 on the selected Scell (e.g., indication of the best Scell or top-N Scells) to the RAN node.

The RAN node would then provide RRC reconfiguration information to the UE to configure information on the selected Scell(s). See block 450.

Note that if only one Scell is indicated in the information 446, then the RAN node 170 would just provide RRC reconfiguration information for that Scell to the UE. If N cells are indicated in the information 446 (the "top N" case, which would be, e.g., an ordered list of N cells), then the RAN node 170 has still some flexibility to choose one or more of those and provide RRC reconfiguration information to the UE for those cells—e.g. the RAN could choose all N cells, or some subset thereof, and the like Exemplary Implementation Details The following includes some reasoning behind the techniques that were presented above and also additional possible implementation details.

As for the reasoning, initially Scells 320 can be assigned to UEs 110 based on some (e.g., sub-optimal) method. For instance, the assignment could be based on just "blind" or random assignment, or requiring the UEs to make inter-frequency measurements, and the like. This means that for some time, the system will be inefficient. Based on this (e.g., inefficient) assignment of Scells 320, we can collect data about the UEs 110 that do manage to enter the coverage of the Scells, such as the following:

1) Measurements (made by the UE or by the RAN node 170) on Pcell: CQI, timing advance, angle of arrival, per-antenna signal measurements, and the like; and/or 2) Measurements on different Scells such as CQI feedback from UEs, or achieved throughput reported by RAN nodes 170.

This data can be used to train a machine learning algorithm 431 such as a neural network implemented in the AI/ML model 430. This model 430 takes as input the Pcell measurements, and outputs a prediction 435 of the S cell CQI for a given Scell. The reasoning here is that the Pcell measurements of a given UE, taken together, constitute a set of data that is essentially a near-unique "signature" of the UE's location within the Pcell, and can with good accuracy pin-point which Scells 320 are likely to provide good channel characteristics at that location. This is the reason the UE Pcell signature 426 is named as such.

The following attributes can be used (see block 424 of FIG. 4) to form UE Pcell signature 426. The signature can be either directly a vector of these attributes, or a function of these attributes. The function may be continuous (e.g., preferably monotonic), or for example may be a type of compression mapping which may have the effect of reducing the dimensionality of the space of the vector of attributes, or itself could be formed using a machine learning algorithm such as an auto-encoder or a support vector machine.

Regarding possible functions, one can first form a vector v=(Pcell CQI, Pcell PHR, Pcell timing advance, Pcell AoA, and the like) (or whatever Pcell measurements there are in the UE-related measurements 470 taken on the Pcell), and then form a function x=f(v). For each "training example", we have then an input x, and the output y is the UE's CQI (or spectral efficiency as indicated by the CQI, and the like) on the Scell. The AI model 430 can either be trained with training data consisting of (x,y) samples where x=f(v), or can be trained with (v,y) where the vector v could be directly input to the neural network rather than first forming a function x=f(v).

One purpose of the x=f(v) operation is dimensionality reduction—in principle you may have a largish number of measurements included in v, many of which may be highly correlated, and you can "compress" the input space. So the function f(•) can be a sort of "companding". A continuous/monotonic map would be one map, but other mappings could be used to form the signature. For example the mapping f(•) itself could be another machine learning algorithm, such as an auto-encoder.

Regarding the possible attributes used in the vector, a first attribute might be CQI (equivalently SINR or spectral efficiency) of UE on the Pcell 330. This attribute roughly identifies how close to the Pcell center the UE is, and how far from the edges Additionally or alternatively, a second attribute might be timing advance, which roughly identifies the distance from the Pcell's center at which the UE is.

Additionally or alternatively, a third attribute might be direction/angle of arrival of UE's signal at the eNB/gNB antenna, which indicates direction of the UE (or direction of a dominant path to the UE) relative to the cell center.

Additionally or alternatively, a fourth attribute might be PHR—power headroom report—a measure of the path loss to the UE, which is a measure of the distance of the UE from the cell.

Additionally or alternatively, a fifth attribute might be per-antenna signal strength measurements in a MIMO Pcell 330, which further narrows down the relative spot of the UE, as the signal strength or phase on different antennas reflects the relative difference between multiple paths from the antennas to the UE.

Additionally or alternatively, a fifth attribute might be, if available, RSRP measurements of the UE to the Pcell, as well as to one or more intra-frequency neighbor cells of the Pcell 330, where each RSRP represents a distance from that neighbor cell, which can be effectively used to 'triangulate' the UE.

Note that there is no need to actually estimate the UE's location from the UE Pcell signature 426, just that these attributes together constitute a near-unique identifier which may be approximately interpreted as corresponding to a location. Thus, the signal strength of Scell at the UE's position, as well as interference experienced in the Scell's carrier at that location, can be fairly accurately predicted based on the UE's Pcell signature. Some of the UE Scell selections will turn out to be efficient, some will not be. As more and more UEs get assigned Scells, however, more training data will be gathered and a better correlation between the UE's Pcell signature 425 and the potential CQI (or other channel quality) on the Scell can be developed, which will manifest as improved training of the AI/ML model 430.

Figure 6:
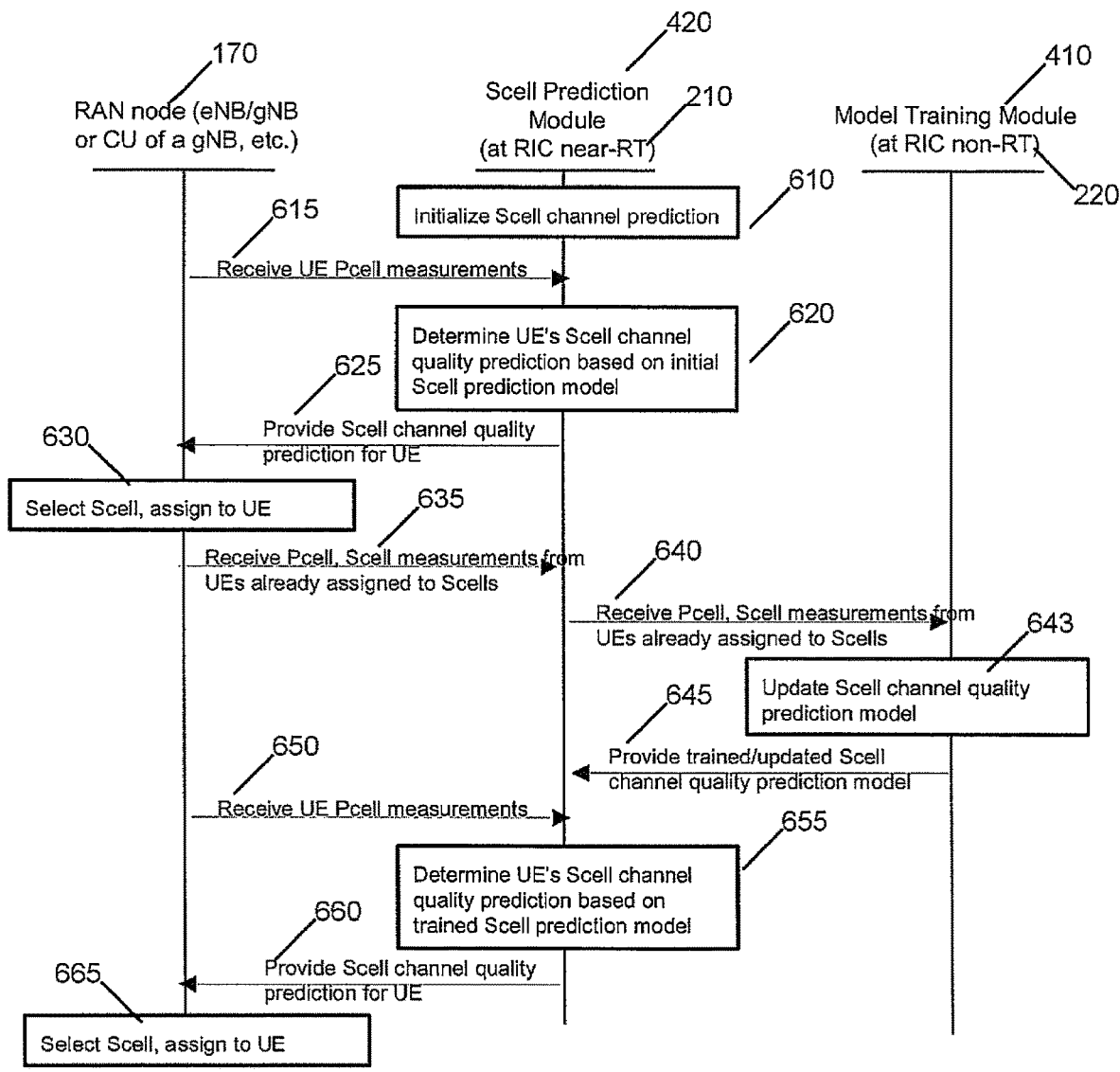
FIG. 6 is a signaling and logic flow diagram for SCell selection and optimization for telecommunication systems such as in carrier aggregation and dual/multi-connectivity for LTE and 5G, in accordance with an exemplary embodiment.

Regarding the message flow, FIG. 6 is a signaling and logic flow diagram for SCell selection and optimization for telecommunication systems such as in carrier aggregation and dual/multi-connectivity for LTE and 5G. FIG. 6 illustrates the operation of an exemplary method or methods, a result of execution of computer program instructions embodied on a computer readable memory, functions performed by logic implemented in hardware, and/or interconnected means for performing functions in accordance with an exemplary embodiment. FIG. 6 shows signaling between the RAN node 170 (e.g., as eNB/gNB, or CU of a gNB, etc.), the Scell prediction module 420 of the RIC near-RT 210, and the model training module 410 of the RIC non-RT 220. The operations that are performed by each entity is assumed to be performed by execution of computer program code on one or more processors, which causes the corresponding entity to perform that action, or by hardware specifically implemented to cause the entity to perform that action, or by some combination of these.

Initially, the Scell selection cane be made based on an initialized (but not fully trained) model 430. The Scell selections will then be pseudo-random, and possibly inefficient. This is illustrated by the operations or signaling in reference numbers 610-630. In block 610, the Scell prediction module 420 initializes Scell channel prediction. The RAN node 170 in step 615 sends and the S cell prediction module 420 receives UE Pcell measurements (e.g., the UE-related measurements 470 taken on the Pcell). In block 620, the Scell prediction module 420 performs the operation of determining UE's Scell channel quality prediction based on the initial Scell prediction model (e.g., in the model 430). The Scell prediction module 420 (e.g., via the RIC near-RT 210) provides in step 625 Scell channel quality prediction for the UE, which is received by the RAN node 170. The RAN node 170 selects an Scell based on this prediction and assigns this Scell to the UE (e.g., via signaling to the UE, not shown in FIG. 6). See block 630.

Pcell and Scell measurements can be gathered from the UEs 110 that have been assigned Scells 320. These measurements can be passed to the model training module 410 (at the RIC non-RT 220) to update the model training, and the updated model 430 is provided to the Scell prediction module (at the RIC near-RT 210). Subsequently, the updated/trained model 430 is used to generate predictions of the channel quality achievable by a UE on one or more Scells. This is illustrated by reference numbers 635-665. Once a sufficient number of UEs 110 have been assigned Scells 320 in this manner, the resulting updated model training will yield improved accuracy.

In step 635, the RAN node 170 transmits and the Scell prediction module 420 (as part of the RIC near-RT 210) receives Pcell, Scell measurements from UEs already assigned to Scells. In step 640, the Scell prediction module 420 (as part of the RIC near-RT 210) transmits and the model training module 410 (as part of RIC near-RT 210) receives Pcell, Scell measurements from UEs already assigned to Scells (see block 460 of FIG. 4). The Scell prediction module 420 can forward the information received, for instance. Alternatively (not indicated in FIG. 6 but illustrated in FIG. 4) the RAN node may directly pass to the RIC non-RT 220 the information on Pcell and Scell measurements from UEs already assigned to Scells (see block 460 of FIG. 4).

The Scell measurements may be the same as Pcell measurements, but typically only a subset of the measurements for the Scell is needed. For example, having just the CQI (or the CQI, PMI, RI) on the Scell may suffice, since the primary interest is in the spectral efficiency. We may try to predict both the signal strength and the spectral efficiency, in which case having both RSRP and CQI on the Scell from the UEs which have already been assigned the Scell would be useful. In either case, the Scell measurements are typically less extensive than Pcell.

Scell measurements should indicate an identifier (e.g., cell ID or ECGI—extended cell global identifier—of the Scell). This is true because, for a given UE, we may have measurements (e.g. CQI) on multiple Scells, and we need to know which CQI is for which Scell.

The model training module 410 updates the Scell channel quality prediction model, represented as AI/ML model 430 in FIG. 4. This updating occurs in block 643. The RIC non-RT 220 (e.g., under direction of the model training module 410) provides (step 645) the trained/updated Scell channel quality prediction model 430 to the RIC near-RT 210 and its corresponding Scell prediction module 420. Note that the model 430 may be defined by layer information and weights, for a neural network for instance. The Scell prediction module 420 subsequently receives (and the RAN node 170 transmits) UE Pcell measurements in step 650. In block 655, the Scell prediction module 420 performs the operation of determining the UE's Scell channel quality prediction 435 based on the trained and updated Scell prediction model. The Scell prediction module 420 provides, in step 660, a new Scell channel quality prediction for the UE to the RAN node 170. Based on this, the RAN node 170 in block 665 selects an Scell and assigns the selected Scell to the UE (e.g., via signaling not shown). It is noted that, for blocks 630 and 665, the UE is expected to use the selected Scell as a new Scell, at least generally. It is possible that some of the UEs will not even be able to connect to their assigned Scell, especially during the phase where the prediction's accuracy is still being improved. This is, however, also useful information, where one could infer that the achievable Scell spectral efficiency corresponding to the Pcell measurements is simply treated as zero, and it is valid to use that as part of the training input. Additionally, typically the RAN node 170 will provide the UE with info about the Scell, called "Scell configuration". The UE then has to go and search/measure the Scell before the UE can actually connect to the Scell. If the Scell is at a different RAN node 170 (e.g., eNB/gNB), then X2 or Xn interface procedures between the eNBs/gNBs may also be invoked.

Additional details are now provided of the data received from the RAN node 170 by the Scell prediction module. The RAN node 170 provides data on measurements related to a given UE's channel in the Pcell, for UEs for which an Scell selection is needed. This is used to form the UE Pcell signature 426 for a particular UE. CQI (equivalently SINR or spectral efficiency) of the UE on the Pcell roughly identifies how close to the Pcell center the UE is, and how far from the edges. Timing advance roughly identifies the distance from the Pcell center the UE is. The direction/angle of arrival of the UE's signal at the eNB/gNB antenna is indicative of direction of the UE (or direction of dominant path to the UE) relative to the cell center. Other measures that can give an indication of the direction or angle of the UE relative to the Pcell center include best-beam indication and beam direction indication, in a cell that employs multiple beams such as with MIMO. The PHR provides a measure of the path loss to the UE, which is a measure of the distance of the UE from the cell. The per-antenna signal strength (and if available, phase) measurements in a MIMO Pcell further narrows down the relative spot of the UE as the signal strength or phase on different antennas reflects the relative difference between multiple paths from the antennas to the UE. These measurements can be based on SRS transmissions from the UE. If available, RSRP measurements of the UE to the Pcell, as well as to one or more intra-frequency neighbor cells of the Pcell, may be used as each RSRP represents a distance from that neighbor cell, which can be effectively used to 'triangulate' the UE. If the Pcell uses massive MIMO, "best beam" information may be used. Typically, however, Pcell will be in the low band, and so large numbers of antennas are not likely. However, in some cases, this information may be available and also used to locate the UE.

In addition, the RAN node 170 can provide data (see block 460 of FIG. 4) on the Pcell and Scell measurements of UEs for which an Scell has been configured already:

1) Pcell measurements: same as above;
2) Scell measurements: Most important is CQI, along with a rank indicator RI, as these are directly reflective of the UE's achievable spectral efficiency. Other measurements along the same lines as for the Pcell may be also provided. Alternative measures may include the MCS (modulation and coding scheme) supportable for the UE, or the achieved throughput.

Details of Scell prediction algorithm (e.g., performed by the Scell prediction module 420) and model training (e.g., performed by the model training module 410) are now provided.

The Scell prediction algorithm used by the Scell prediction module 420 can be implemented as a deep neural network (DNN), which is typically defined as a neural network (NN) with two or more hidden layers. The following description also refers to FIG. 7, which is an illustration of an exemplary AI/ML model 430, which is a deep neural network (DNN) 730 in this example, and its inputs and outputs, in accordance with an exemplary embodiment. The DNN 730 is an example of the "combined neural network" version described above. The DNN 730 has four layers 710-1 through 710-4, of which layer 710-1 is an input layer with four nodes, where each node corresponds to one of the attributes 720, layers 720-2 and 720-3 are hidden layers, and layer 710-4 is an output layer of two nodes for two Scells 320, Scell 1 320-1 and Scell 2 320-2.

Inputs to the neural network 730 are the UE PCell signature 426. This is a set (e.g., a vector) of attributes 720. In this example the attributes 720 include the following: spectral efficiency on Pcell (based on CQI) 720-1; timing advance 720-2; PHR 720-3; and angle of arrival 720-4. Reference 720-x indicates that other attributes 720 might be used, such as RSRP, antenna phase and beam information (information), and the like. These would entail a larger vector and corresponding nodes for the layer 710-1. Note that other attributes may also be used, too, rather than the attributes shown.

Outputs 740 can be the predicted achievable channel quality (e.g., spectral efficiency or CQIs or SINRs) of the UEs on one or more Scells:

a) Either a single value of the CQI (e.g., mean or median) can be output;

b) Or a set of quantiles or upper and lower bounds, based on a probabilistic estimate can be output—e.g., the neural network 730 may output a mean and a measure of variation (e.g., standard deviation, or 5th and 95th-percentiles) of the achievable spectral efficiency.

Note that predictions may be determined for DL channel quality and/or UL channel quality.

In one example, the outputs 735 form the prediction 435, and all the outputs 735 might be used, such as being sent from the RIC near-RT 210 to the RAN node 170.

The neural network 730 can be trained based on the data of UE Pcell signature 426, measured, e.g., as CQI on Scells, of UEs that have already been assigned Scells. The model training can be performed at the RIC non-RT 220, e.g., by the model training module 410. Trained model parameters may be provided over an A1 interface to the Scell prediction module 420 at the RIC near-RT. The Scell prediction module 420 uses a trained version of DNN 730.

A further possible enhancement is as follows. Rather than just using the current (e.g., snapshot) of the UE Pcell signature 426, a 'trajectory prediction' module can be used in the Scell prediction module 420. As the UE moves around, its UE Pcell signature 426 will evolve in a multi-dimensional space. This vector-time-series of the UE Pcell signature 426 over time can be used to predict the likely evolution of the UE Pcell signature 426 (possibly using another neural network such as long short-term memory, LSTM). Additionally, "bounding points" of the likely trajectory of evolution of the UE Pcell signature 426 can then be used as inputs into the neural network 730 to predict upper and lower bounds of the achievable spectral efficiency on one or more Scells.

As a potential enhancement, the Scell prediction module 420 may perform selection of the best Scell. This has been previously described in reference to FIG. 5, but additional details are now provided with reference to FIG. 5.

The Scell prediction module 420 makes a determination of the best Scell in block 445-1, rather than just predicting the achievable spectral efficiency and letting the RAN pick the best Scell. This allows the RIC near-RT 210 to implement more sophisticated theoretically-optimal algorithms that take both load and spectral efficiency on Pcell and Scell into account. One example is given below.

The RAN's proportionally fair (PF) scheduler maximizes a log utility function (sum of the log of the throughputs of all UEs). With carrier aggregation, where a UE can get throughput from multiple carriers simultaneously, the optimal selection logic for selecting Scells for the UE is to select the Scell that maximizes the ratio of the UE's spectral efficiency on the Scell to the load (e.g. represented by the Scell's PF metric) on the Scell. The RAN can provide an estimate of the Scell load (e.g., a PF metric or other load metric). By predicting the UE's achievable spectral efficiency on one or more Scells, and by using an estimate of the Scell's load (or PF metric) provided by the RAN node 170, the Scell prediction module 420 can select the best Scell, or generate a list of top-N Scells for some suitable value of N.

Benefits and Technical Effects

Without in any way limiting the scope, interpretation, or application of the claims appearing below, possible benefits and technical effects of the exemplary embodiments include the following. For operators, the exemplary embodiments provide:

Better performance, e.g., via more accurate Scell assignment without inter-frequency measurement overhead and better battery life; and/or Open APIs towards the RAN node 170, which enables operators to introduce third-party optimizers that could improve the performance of any RAN, using multi-vendor-common definitions of APIs towards the RAN; and/or Offers the potential of enhanced network performance, as well as common behavior across multiple vendor deployments.

For hardware providers, the exemplary embodiments provide:

In an open/multi-vendor ecosystem, enables an opportunity for the hardware provider to provide value-add differentiating optimizations to RRM algorithms such as CA Scell selection, that can be used across multiple vendor RANs; and/or In a hardware-provider-driven deployment, enables an opportunity for the hardware provider to provide some of these APIs and optimizations as proprietary extensions to a smaller set of API elements (e.g., exposed data, control actions) that may be multi-vendor common; and/or Thus operators can still get some level of commonality across vendors, but the hardware provider can provide further level of differentiation on top of this common set of elements on the API; and/or With non-XRAN/ORAN operators, can be a value-added proposition by the hardware provider.

CONCLUDING COMMENTS

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1A. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

What is claimed is:

1. A method, comprising:
    forming user equipment-related measurements taken on a primary cell in a wireless communication system into a set of data, wherein the primary cell also overlaps with one or more secondary cells in the wireless communication system and wherein the user equipment-related measurements on the primary cell are for a specific user equipment in the primary cell;
    predicting, using a machine learning algorithm applied to the set of data, achievable channel quality for the specific user equipment for each of the one or more of the secondary cells; and
    outputting at least one of the predicted achievable channel qualities for the specific user equipment to be used for secondary cell selection for the specific user equipment.

2. The method of claim 1, wherein the outputting comprises outputting the predicted achievable channel qualities toward a radio access network node that forms the primary cell.

3. The method of claim 1, further comprising:
    selecting, based on the output at least one of the predicted achievable channel qualities for the specific user equipment, at least one secondary cell from the one or more secondary cells to be used for secondary cell selection for the specific user equipment; and
    sending indication of the at least one selected cell toward a radio access network node that forms the primary cell.

4. The method of claim 1, wherein the user equipment-related measurements taken on the primary cell comprise one or both of user equipment-related measurements taken by the primary cell for the specific user equipment or user equipment-related measurements taken on the primary cell by the specific user equipment.

5. The method of claim 4, wherein the user equipment-related measurements taken by the primary cell comprise one or more of the following for the specific user equipment: timing advance; angle of arrival; signal strength measurements, per-antenna signal strength measurements, per-antenna phase measurements, and/or beam-related measurements.

6. The method of claim 4, wherein the user equipment-related measurements taken by the specific user equipment comprise one or more of the following for the specific user equipment: channel quality indicator; signal to interference plus noise ratio; spectral efficiency; power headroom report; beam-related measurements; and/or reference signal received power.

7. The method of claim 1, performed by a first network node, wherein:
    the user equipment-related measurements for the primary cell further comprise user equipment-related measurements taken by the primary cell for one or more other user equipment and user equipment-related measurements for the primary cell taken on the primary cell by the one or more other user equipment;
    the user equipment-related measurements for the primary cell further comprise user equipment-related measurements for the primary cell for one or more additional user equipment already assigned to at least one of the one or more secondary cells that overlap with the primary cell and user equipment-related measurements for the primary cell taken by the primary cell for the additional one or more other user equipment;
    the method further comprises forming the user equipment-related measurements for the primary cell into multiple versions of the set of data;
    the method further comprises determining, from the user equipment-related measurements for the primary cell, one or more measurements of channel quality corresponding to one or more of the secondary cells, each of the one or more measurements of channel quality corresponding to individual versions of set of data; and
    the method further comprises sending the multiple versions of the set of data and the corresponding one or more measurements of channel quality toward a model training module, for use by the model training module in training the machine-learning algorithm.

8. The method of claim 1, wherein forming further comprises forming each set of data by applying a function to the user equipment-related measurements for the primary cell to create the corresponding set of data.

9. A method, comprising:
forming, at a radio access network node, user equipment-related measurements taken on a primary cell in a wireless communication system into a set of data, wherein the primary cell also overlaps with one or more secondary cells in the wireless communication system, wherein the user equipment-related measurements are for a specific user equipment in the primary cell, and wherein the primary cell is formed by the radio access network node;
sending the set of data toward a secondary cell prediction module for the secondary cell module to determine information suitable to enable secondary cell selection for the specific user equipment;
receiving the information from the secondary cell prediction module, the information further allowing the radio access network node to inform the selected user equipment of selected at least one of the one or more secondary cells to be used for secondary cell selection for the specific user equipment; and
sending by the radio access network node indication of the at least one selected secondary cell toward the specific user equipment.

10. The method of claim 9, wherein the information comprises information for a selected one of the one or more secondary cells or a selected N of the secondary cells, where N is an integer greater than one, and sending comprises sending by the radio access network node indication of the selected secondary cell or the selected N secondary cells toward the specific user equipment.

11. The method of claim 9, wherein:
the information comprises a prediction from the secondary cell prediction module of achievable channel quality for the specific user equipment for at least one of the one or more of the secondary cells, the prediction comprising predicted achievable channel qualities for the specific user equipment based on the sent user equipment-related measurements in the set of data;
the method further comprises selecting, based on the prediction and one or more additional factors, the at least one secondary cell to be used for the secondary cell selection for the specific user equipment.

12. The method of claim 9, wherein:
the radio access network node comprises the secondary cell prediction module; and
sending the set of data toward the secondary cell prediction module further comprises sending the user equipment-related measurements from first functionality in the radio access network node toward the secondary cell prediction module in the radio access network node.

13. The method of claim 9, wherein:
the secondary cell prediction module is in an other network node separate and different from the radio access network node; and
sending the set of data toward the secondary cell prediction module further comprises sending by the radio access network node the user equipment-related measurements from the radio access network node toward the other network node.

14. The method of claim 9, wherein the user equipment-related measurements taken on the primary cell comprise one or both of user equipment-related measurements taken by the primary cell for the specific user equipment or user equipment-related measurements taken on the primary cell by the specific user equipment.

15. The method of claim 14, wherein the user equipment-related measurements taken by the primary cell comprise one or more of the following for the specific user equipment: timing advance; angle of arrival; signal strength measurements, per-antenna signal strength measurements, per-antenna phase measurements, and/or beam-related measurements for a case where primary cell has multiple beams in a massive multiple input, multiple output system.

16. The method of claim 14, wherein the user equipment-related measurements taken by the specific user equipment comprise one or more of the following for the specific user equipment: channel quality indicator; signal to interference plus noise ratio; spectral efficiency; power headroom report; beam-related measurements; and/or reference signal received power.

17. The method of claim 9, wherein the secondary cell prediction module uses a machine learning algorithm, and wherein the method further comprises:
taking by the radio access network node the user equipment-related measurements for the primary cell for one or more other user equipment;
receiving by the radio access network node user equipment-related measurements for the primary cell taken on the primary cell by the one or more other user equipment;
receiving by the radio access network node feedback from one or more additional user equipment already assigned to at least one of the one or more secondary cells that overlap with the primary cell, the feedback comprising user equipment-related measurements for the primary cell for the one or more additional user equipment; and
taking by the radio access network node the user equipment-related measurements for the primary cell for the additional one or more other user equipment;
forming the user equipment-related measurements for the primary cell into multiple versions of the set of data;
determining, from the user equipment-related measurements for the primary cell, one or more measurements of channel quality corresponding to one or more of the secondary cells, each of the one or more measurements of channel quality corresponding to individual versions of set of data; and
sending the multiple versions of the set of data and the corresponding one or more measurements of channel quality toward a model training module, for use by the model training module in training the machine-learning algorithm.

18. The method of claim 1, wherein a connection of the specific user equipment to a secondary cell may be either by carrier aggregation or dual connectivity.

19. The method of claim 1, wherein a secondary cell may be at a same radio access network node as the primary cell, or be at a different radio access network node as the primary cell.

20. A method, comprising:
receiving multiple sets of data, the multiple sets of data comprising user equipment-related measurements taken on a primary cell in a wireless communication system and corresponding measurements of channel quality for one or more secondary cells, wherein the primary cell overlaps with the one or more secondary cells in the wireless communication system and wherein the user equipment-related measurements of the primary cell are for user equipment in the primary cell;
performing training of a machine learning algorithm at least by applying the multiple sets of data to the machine learning algorithm, wherein the machine learning algorithm is configured to output a prediction of achievable channel quality for each of the one or more secondary cells; and outputting, in response to training being completed on the machine-learning algorithm, information defining the trained machine-learning algorithm.

* * * * *